United States Patent
Onoe et al.

(10) Patent No.: US 11,240,402 B2
(45) Date of Patent: Feb. 1, 2022

(54) OPTICAL SCANNING DEVICE, IMAGING DEVICE, AND DISTANCE MEASUREMENT DEVICE

(71) Applicant: Hitachi, Ltd., Tokyo (JP)

(72) Inventors: Shinsuke Onoe, Tokyo (JP); Toshiteru Nakamura, Tokyo (JP); Kenichiro Yamada, Tokyo (JP); Takahiro Matsuda, Tokyo (JP); Yoshiho Seo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 122 days.

(21) Appl. No.: 15/869,830

(22) Filed: Jan. 12, 2018

(65) Prior Publication Data

US 2018/0205854 A1    Jul. 19, 2018

(30) Foreign Application Priority Data

Jan. 19, 2017    (JP) .............................. JP2017-007174

(51) Int. Cl.
*H04N 3/02*    (2006.01)
*H04N 3/28*    (2006.01)
(Continued)

(52) U.S. Cl.
CPC .............. *H04N 3/02* (2013.01); *G01S 7/4817* (2013.01); *G01S 7/4818* (2013.01); *G01S 17/42* (2013.01);
(Continued)

(58) Field of Classification Search
CPC .......... H04N 3/02; H04N 3/28; G01S 7/4817; G01S 7/4818; G01S 17/42; G01S 17/08; G02B 6/4206; G02B 6/4239
(Continued)

(56) References Cited

U.S. PATENT DOCUMENTS

| 4,995,102 A * | 2/1991 | Ichinose | G01S 7/4812 |
| | | | 342/158 |
| 2014/0022365 A1* | 1/2014 | Yoshino | A61B 1/00096 |
| | | | 348/65 |

(Continued)

FOREIGN PATENT DOCUMENTS

| CN | 103841877 A | 6/2014 |
| JP | 2008-514342 A | 5/2008 |

(Continued)

OTHER PUBLICATIONS

Chinese-language Office Action issued in counterpart Chinese Application No. 201810018422.X dated Jan. 21, 2020 with English translation (20 pages).

(Continued)

*Primary Examiner* — John W Miller
*Assistant Examiner* — Omer Khalid
(74) *Attorney, Agent, or Firm* — Crowell & Moring LLP

(57) ABSTRACT

An optical scanning device for displaying or capturing an image is used, the device including: an optical scanning unit configured to scan emitted light while drawing a spiral trajectory, wherein the unit includes: a light guide path configured to guide incident light to output the emitted light from an emission end; and a vibration unit configured to vibrate the emission end; a light emission control unit configured to control light emission of the emitted light; a polar coordinate generation unit configured to generate a radius and a deflection angle relating to the spiral trajectory; a driving signal generation unit configured to generate a driving signal for driving the vibration unit; an angle correction unit configured to perform calculation for correcting an angle based on information from the driving signal generation unit and output a corrected angle; and a coor-
(Continued)

dinate calculation unit configured to calculate coordinates of an image.

9 Claims, 22 Drawing Sheets

(51) Int. Cl.
    *G01S 17/42*     (2006.01)
    *G01S 17/08*     (2006.01)
    *G01S 7/481*     (2006.01)
    *G02B 6/42*     (2006.01)

(52) U.S. Cl.
    CPC ............... *H04N 3/28* (2013.01); *G01S 17/08* (2013.01); *G02B 6/4206* (2013.01); *G02B 6/4239* (2013.01)

(58) Field of Classification Search
    USPC .......................................................... 348/197
    See application file for complete search history.

(56) References Cited

U.S. PATENT DOCUMENTS

2015/0346115 A1* 12/2015 Seibel ................. H04N 5/2256
    348/50
2016/0004072 A1     1/2016   Kasai
2017/0041577 A1     2/2017   Nishimura

FOREIGN PATENT DOCUMENTS

| | | |
|---|---|---|
| JP | 2012-231910 A | 11/2012 |
| JP | 2012-231911 A | 11/2012 |
| JP | 2014-61226 A | 4/2014 |
| JP | 2014-180317 A | 9/2014 |
| JP | 2015-206981 A | 11/2015 |
| JP | 2016-19656 A | 2/2016 |
| JP | 2016-106726 A | 6/2016 |
| WO | WO 2006/041452 A1 | 4/2006 |
| WO | WO 2015/100422 A1 | 7/2015 |
| WO | WO 2015/162860 A1 | 10/2015 |
| WO | WO 2017/203585 A1 | 3/2019 |

OTHER PUBLICATIONS

Japanese-language Office Action issued in Japanese Application No. 2017-007174 dated Jul. 14, 2020 with English translation (12 pages).
Japanese-language Office Action issued in Japanese Application No. 2017-007174 dated Mar. 1, 2021 with English translation (six (6) pages).

* cited by examiner

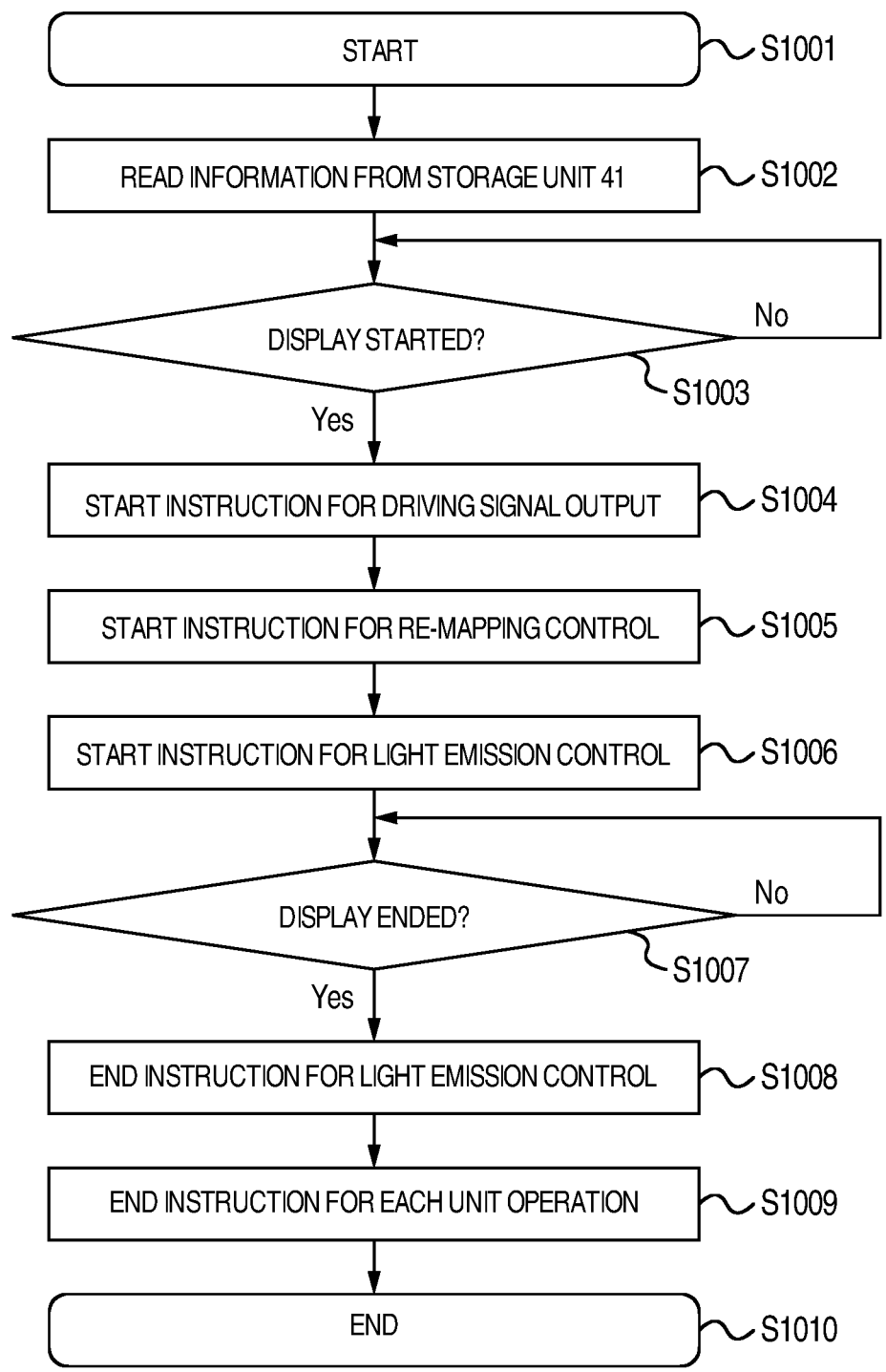

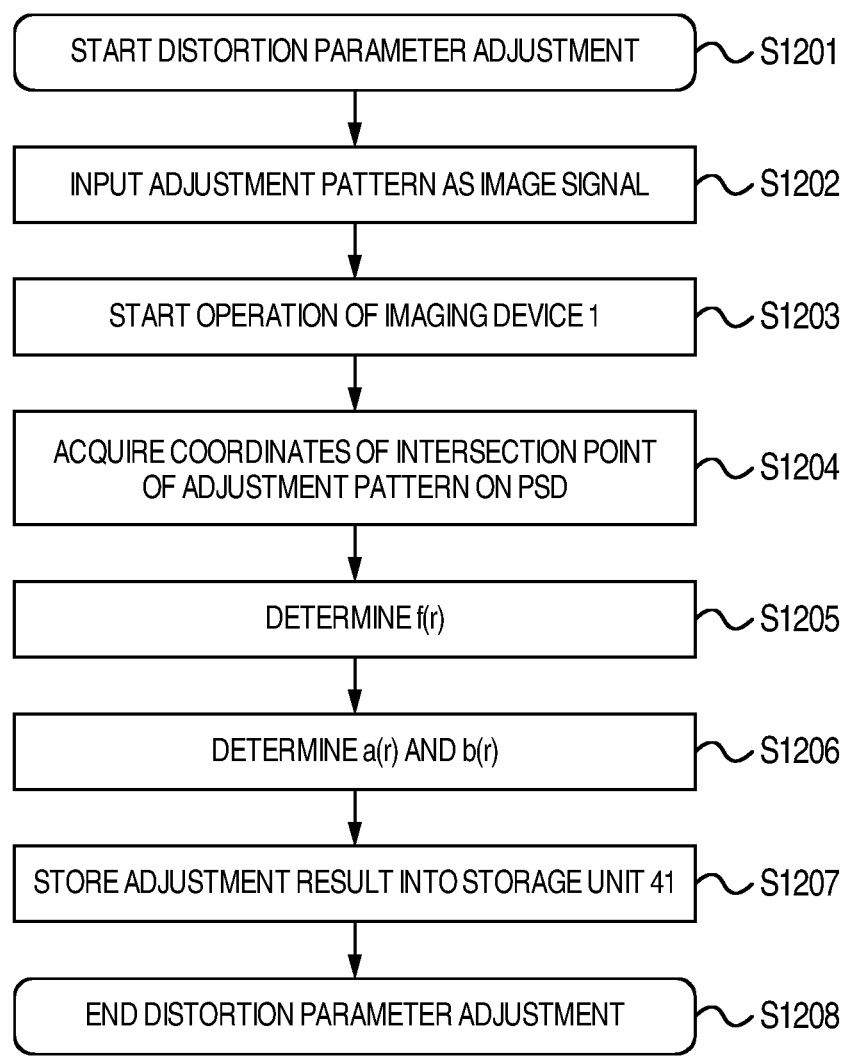

OPTICAL SCANNING DEVICE, IMAGING DEVICE, AND DISTANCE MEASUREMENT DEVICE

INCORPORATION BY REFERENCE

The present application claims priority from Japanese application JP 2017-007174 filed on Jan. 19, 2017, the content of which is hereby incorporated by reference into this application.

BACKGROUND OF THE INVENTION

1. Field of the Invention

The present invention relates to an optical scanning device, an imaging device, and a distance measurement device.

2. Description of the Related Art

With the miniaturization of imaging devices, the miniaturization and the performance improvement of optical scanning devices are required. JP-A 2014-180317, the counterpart US Publication of which is US2016-0004072, discloses a technology related to an optical fiber scanner. In paragraph 0017 of JP-A 2014-180317, described is that "As illustrated in FIGS. 1 through 3, an optical fiber scanner 1 includes an optical fiber 6 for allowing illumination light from a light source 5 to be incident from an incidence end 6a of a base end side, guiding light in a longitudinal direction, and emitting the light from an emission end 6b, a vibration generation unit 7 for vibrating the emission end 6b of the optical fiber 6 in a direction intersecting with a longitudinal axis, and a vibration damping member 8 for damping the generated vibration."

JP-A 2008-514342, the counterpart PCT Publication of which is WO 2006/041452, describes that "in practice, environmental variables or manufacturing variables, such as aberrations, sensitivity of a scanning fiber device near a resonant frequency, and other factors in a nonlinear driving electron device, a nonlinear driving mechanism, and an imaging system of a fiber scanning system increase the inaccuracy of a position of an illumination spot in a scanning pattern and add distortion to an image constructed by a scan fiber device.

In addition, JP-A 2015-206981, the counterpart US Publication of which is US2017-0041577, describes that "when a phase shift θn occurs, an original image as illustrated in FIG. 5A is formed as an image in which a central portion is particularly twisted in a peripheral direction as illustrated in FIG. 5B.

SUMMARY OF THE INVENTION

As disclosed in JP-A 2008-514342, distortion occurs with respect to an image displayed or acquired by an optical fiber scanner. In the invention disclosed in JP-A 2008-514342, an actual scanning trajectory is acquired by a PSD (Position Sensitive Detection) or the like, and this is all stored in a memory. In the memory, it is necessary to store a look-up table including a time point and a corresponding position of an illumination spot. Even when made undersampling and then stored, the required memory capacity becomes enormous, which restricts hardware. In addition, in JP-A 2015-206981, distortion in a rotating direction is mentioned and an example of correcting means is disclosed. However, in the invention disclosed in JP-A 2015-206981, the correction for the distortion of the image is not sufficient and the reliability is not high.

Therefore, an object of the present invention is to provide an optical scanning device, an imaging device, and a distance measurement device, which can perform excellent image display or imaging.

The above object is achieved by an optical scanning device for displaying or capturing an image, the optical scanning device including: an optical scanning unit configured to scan emitted light while drawing a spiral trajectory, wherein the optical scanning unit includes: a light guide path configured to guide incident light to output the emitted light from an emission end; and a vibration unit configured to vibrate the emission end; a light emission control unit configured to control light emission of the emitted light; a polar coordinate generation unit configured to generate a radius and a deflection angle relating to the spiral trajectory; a driving signal generation unit configured to generate a driving signal for driving the vibration unit by using the radius and the deflection angle; an angle correction unit configured to perform calculation for correcting an angle based on information from the driving signal generation unit and output an corrected angle; and a coordinate calculation unit configured to calculate coordinates of an image by using the corrected angle and output image coordinates.

According to the present invention, it is possible to perform excellent image display or imaging.

Other objects, features and advantageous of the invention will become apparent from the following description of the embodiments of the invention taken in conjunction with the accompanying drawings.

BRIEF DESCRIPTION OF THE DRAWINGS

FIG. 10 is a flowchart of a controller 40 in the first embodiment;

FIG. 12 is a flowchart of distortion parameter adjustment in the first embodiment;

DESCRIPTION OF THE EMBODIMENTS

Hereinafter, embodiments of the present invention will be described with reference to the drawings.

First Embodiment

Figure 1:
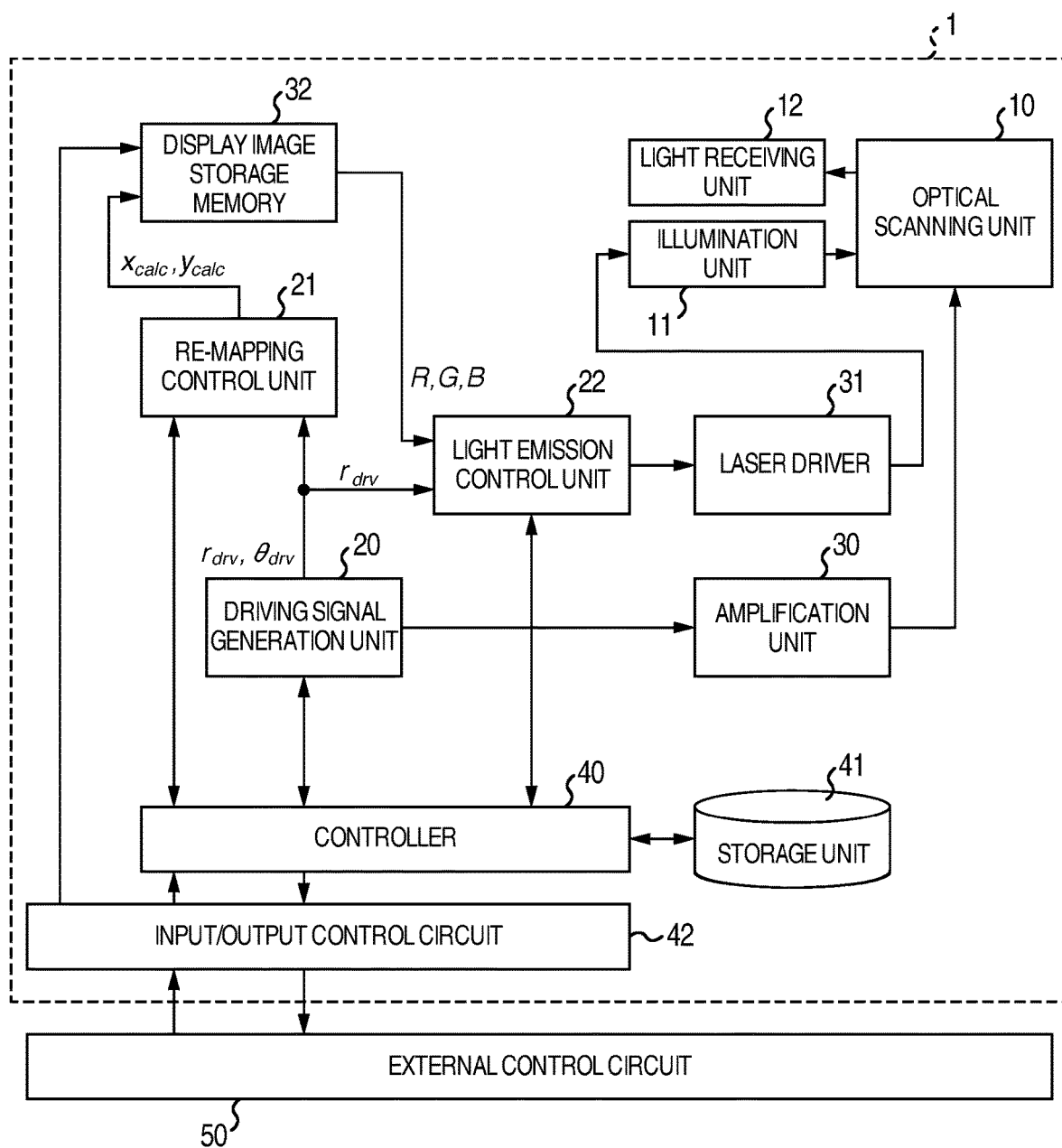
FIG. 1 is a block diagram illustrating a configuration of an imaging device 1 of a first embodiment.

The embodiment of the present invention will be described with reference to the accompanying drawings. FIG. 1 is a block diagram illustrating an imaging device 1 including an optical scanning unit 10. The imaging device 1 is a device having a function of projecting an image, for example, a projector or a head-mount display. Alternatively, the imaging device 1 may be a device having a function of capturing an image, for example, a camera or an endoscope.

The imaging device 1 includes an optical scanning unit 10, an illumination unit 11, a light receiving unit 12, a driving signal generation unit 20, a re-mapping control unit 21, a light emission control unit 22, an amplification unit 30, a laser driver 31, a display image storage memory 32, a controller 40, a storage unit 41, and an input/output control circuit 42. As one example, the driving signal generation unit 20, the re-mapping control unit 21, and the light emission control unit 22 in the present embodiment are implemented as a logic circuit by a field programmable gate array (FPGA). Alternatively, the driving signal generation unit 20, the re-mapping control unit 21, and the light emission control unit 22 in the present embodiment may be implemented by hardware such as application specific integrated circuit (ASIC) or the like.

The imaging device 1 is connected to an external control device 50 through the input/output control circuit 42. The imaging device 1 in the present embodiment has a function of receiving an image signal from the external control device 50 and displaying an image. The controller 40 controls each block of the imaging device 1. The controller 40 realizes its function by a central arithmetic processing device such as a central processing unit (CPU).

In addition, the storage unit 41 stores information necessary for processing of each unit constituting the imaging device 1, including the controller 40, or generated information. The storage unit 41 is a storage device such as a random access memory (RAM) or a flash memory, and functions as a storage area for temporarily reading programs or data. The storage unit 41 may be storage media capable of writing and reading information, such as hard disk drive (HDD), compact disc-recordable (CD-R), digital versatile disk-random access memory (DVD-RAM), or Solid State Drive (SSD), and a storage media driving device. It should be noted that the controller 40 performs processing by the CPU operating according to a program read on the storage unit 41.

An image signal received through the input/output control circuit 42 by the imaging device 1 is stored in the display image storage memory 32. The driving signal generation unit 20 generates (a plurality of) driving signals for scanning light in the optical scanning unit 10, based on an instruction from the controller. The driving signal output from the driving signal generation unit 20 is amplified by the amplification unit 30 and is applied to a piezoelectric element provided in the optical scanning unit 10. Due to this, light is scanned. Based on information from the driving signal generation unit 20, the re-mapping control unit 21 calculates coordinates of pixel information by which light is turned on among pieces of image ycalc) are supplied to the display image storage memory 32, and gradation data (R, G, B) of a pixel of the corresponding coordinates is supplied to the light emission control unit 22. The light emission control unit 22 generates a signal for controlling the light emission of the laser based on the gradation data of the pixel. Further, the light emission control unit 22 performs correction of brightness based on the information from the driving signal generation unit 20. The signal generated by the light emission control unit 22 is supplied to the laser provided in the illumination unit 11 through the laser driver 31. The light emitted from the laser is irradiated onto the projection plane through the optical scanning unit 10. Due to this, the light emission of the laser is controlled in synchronization with the scanning of the light.

In the case of capturing an image, light irradiated onto an object and returned back is guided to the light receiving unit 12 through the optical scanning unit 10. In a case where the imaging device 1 does not have a capturing function, the light receiving unit 12 is not necessarily required. Further, the light emission control unit 22 may have a function of notifying a light emission timing to another circuit.

Figure 2:
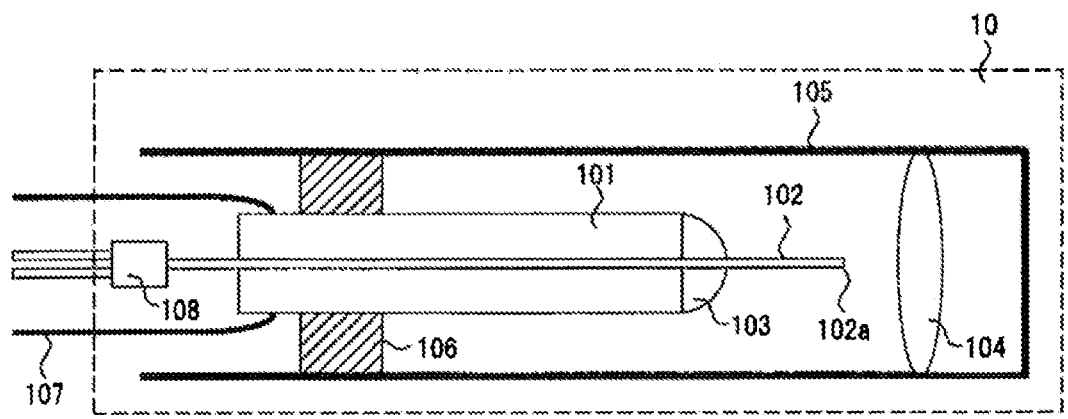
FIG. 2 is a block diagram illustrating a configuration of an optical scanning unit 10 of the first embodiment.

Next, the configuration of the optical scanning unit 10 will be described with reference to FIG. 2. The optical scanning unit 10 includes a vibration unit 101, a light guide path 102, an adhesive part 103, a lens 104, a housing 105, a support member 106, an electric wire 107, and a demultiplexing unit 108. The demultiplexing unit 108 will be described later. The vibration unit 101 is an actuator that generates vibration, for example, a piezoelectric actuator, an electromagnetic actuator, or an electrostatic actuator. In the present embodiment, the vibration unit 101 is configured by providing a plurality of electrodes on an inner periphery or an outer periphery of a cylindrical piezoelectric element having a hollow central portion. The electrodes provided in the vibration unit 101 is connected to the electric wire 107, and the vibration unit 101 is vibrated based on the driving signal applied through the electric wire 107. The light guide path 102 is provided in the hollow portion of the vibration unit 101, and the vibration unit 101 and the light guide path 102 are fixed by the adhesive part 103. In addition, the vibration unit 101 is fixed to the housing 105 by the support member 106.

The light guide path 102 is, for example, an optical fiber of a single mode or a multiple mode. The optical fiber includes a coat layer, a clad layer, and a core layer, and light is confined in the core layer and propagated. The optical fiber, from which the coat layer is peeled off, may be used for the light guide path 102. Due to this, the size of the light scanning unit 10 can be reduced. In the case of capturing an image, the light guide path 102 captures light returned from an object. The return light is finally guided to the light receiving unit 12. In order to increase the efficiency of capturing the return light, the light guide path 102 may use a plurality of optical fibers, or may use a multi-core type optical fiber. The lens 104 is a lens made of glass or a resin. The lens 104 is a spherical or aspherical lens, and may be a Fresnel lens or a refractive index distribution type gradient index (GRIN) lens. In addition, the lens 104 may be integrated with an emission end 102a of the light guide path 102. Further, the lens 104 may be configured by a plurality of lenses, instead of a single lens.

In the present embodiment, the emission end 102a of the light guide path 102 protrudes in a cantilever shape with the adhesive part 103 as a fixed end. When the vibration unit 101 is vibrated, the emission end 102a of the light guide path 102, which is a free end, resonantly vibrates. Due to this vibration, light emitted from the light guide path 102 is irradiated onto an object surface through the lens 104, and scanning of light is performed.

Figure 3:
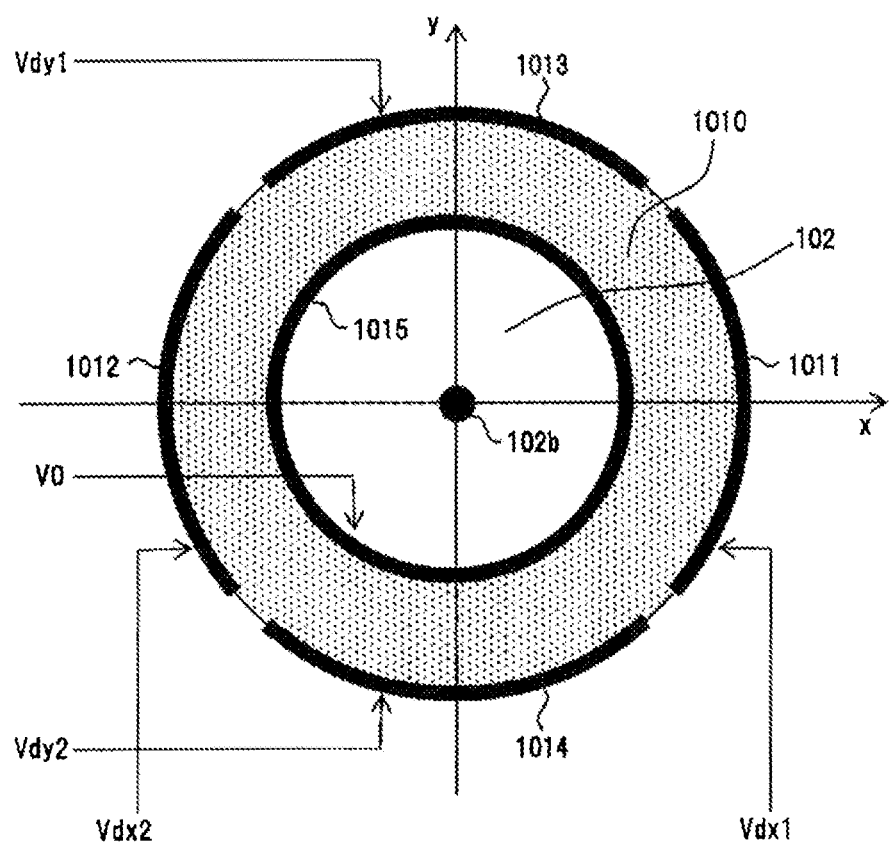
FIG. 3 is a cross-sectional view of the optical scanning unit 10 of the first embodiment.

FIG. 3 is a cross-sectional view of the optical scanning unit 10, taken along a cross section parallel to a longitudinal direction of the light guide path 102. The vibration unit 101 is configured by arranging electrodes 1011, 1012, 1013, and 1014 on an outer periphery of a hollow cylindrical piezoelectric element 1010 and arranging an electrode 1015 on an inner periphery thereof. The four electrodes 1011, 1012, 1013, and 1014 may be arranged on the inner periphery of the piezoelectric element 1010. The light guide path 102 is provided in the hollow portion of the piezoelectric element 1010. The light guide path 102 illustrated in FIG. 3 has a core part 102b. Each electrode has, for example, a substantially rectangular shape having a long side parallel to the longitudinal direction of the cylindrical piezoelectric element 1010, that is, the longitudinal direction of the light guide path 102. The emission end 102a that is the free end of the light guide path 102 is vibrated by pairing the electrode 1011 and the electrode 1012 facing each other and the electrode 1013 and the electrode 1014 facing each other and applying a sinusoidal voltage thereto. In addition, the emission end 102a is vibrated in a circular trajectory by shifting the phase of the sine wave applied to different pairs by about 90 degrees. In addition, the emission end 102a draws a spiral trajectory by temporally changing the amplitude of the sine wave to be applied. As a result, the light emitted from the light guide path 102 draws a spiral trajectory on the object surface, and two-dimensional scanning of light is possible.

Here, x axis and y axis are defined as illustrated in FIG. 3. In addition, a voltage applied to the electrode 1011, a voltage applied to the electrode 1012, a voltage applied to the electrode 1013, and a voltage applied to the electrode 1014 are defined as Vdx1, Vdx2, Vdy1, and Vdy2, respectively. In the case of the configuration of the present embodiment, the piezoelectric element 1010, which functions as the actuator, can be divided into four regions, that is, a region interposed between the electrode 1011 and the electrode 1015, a region interposed between the electrode 1012 and the electrode 1015, a region interposed between the electrode 1013 and the electrode 1015, and a region interposed between the electrode 1014 and the electrode 1015.

Figure 4:
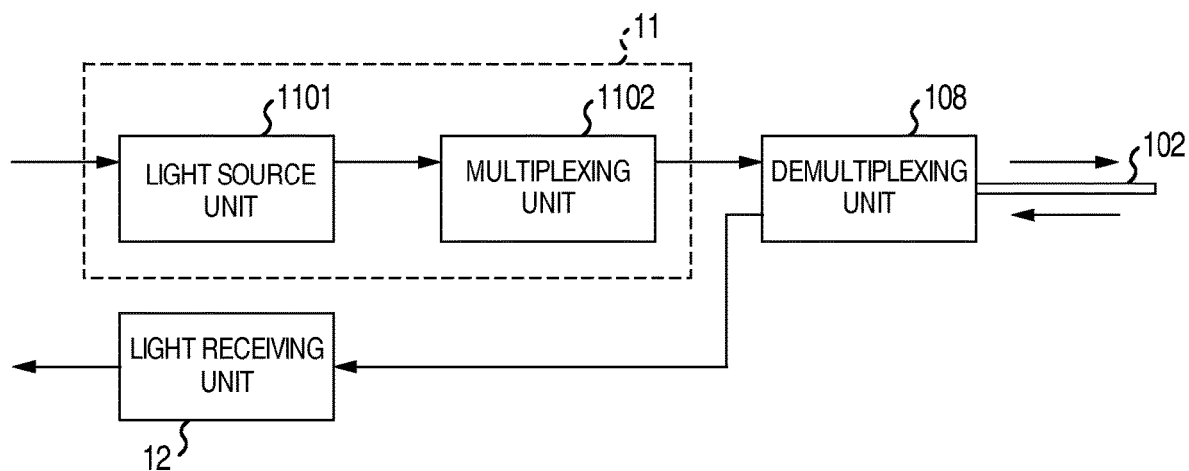
FIG. 4 is a diagram showing a relationship between an illuminating unit 11, a light receiving unit 12, and a demultiplexing unit 108 in the first embodiment.

FIG. 4 is a diagram showing a relationship between the illuminating unit 11, the light receiving unit 12, and the demultiplexing unit 108 inside the optical scanning unit 10. The illumination unit 11 includes a light source unit 1101 and a multiplexing unit 1102. The light source unit 1101 includes at least one light source, and one or more lights emitted from the light sources are multiplexed by the multiplexing unit 1102 and guided to the demultiplexing unit 108 of the optical scanning unit 10 through the optical fiber (not illustrated). The light source unit 1101 of the present embodiment is provided with lasers corresponding to three primary colors of light, that is, red, green, and blue colors, and light of an arbitrary color is guided by the multiplexing unit 1102. The demultiplexing unit 108 has a function of guiding light from the illumination unit 11 to the light guide path 102. As a result, light is guided from the emission end 102a of the light guide path 102. Further, the demultiplexing unit 108 is incorporated in the light guide path 102 and guides light returned from the object to the light receiving unit 12. The light receiving unit 12 corresponds to a light receiving unit of a camera, and outputs information according to the intensity of the light returned from the object. The light receiving unit 12 includes, for example, a color filter, a lens, and a detector.

Figure 5A:
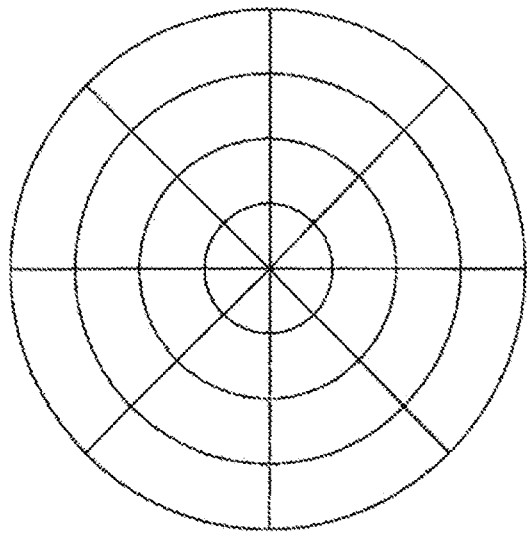
FIGS. 5A and 5B are diagrams for describing distortion of a projected image by the optical scanning unit 10 in the first embodiment.
Figure 5B:
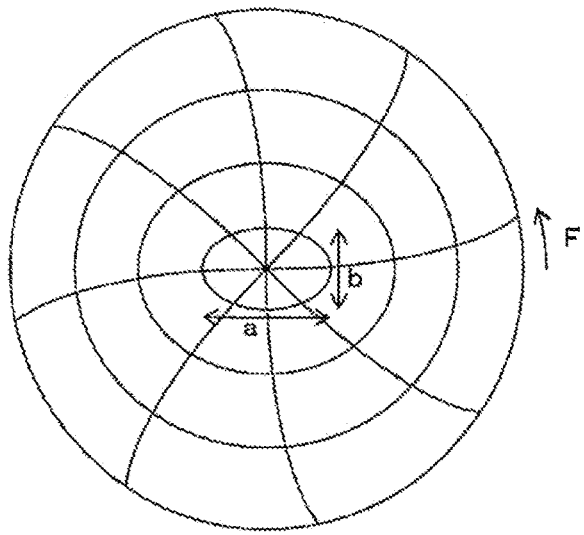

As a problem of the case of using the optical scanning unit 10 that performs scanning of light by using the resonance of the cantilever including the light guide path 102 as in the imaging device 1 of the present embodiment, the light emitted from the light guide path 102 does not draw the ideal trajectory and causes distortion in the projected image, as disclosed in JP-A 2008-514342. The distortion of the projected image by the optical scanning unit 10 will be described with reference to FIGS. 5A and 5B. A case where an image as illustrated in FIG. 5A is projected as the projected image will be considered. FIG. 5A is an image including a plurality of concentric circles having different radii and a plurality of straight lines passing through the center of the concentric circle and having different gradients. Ideally, the same image as in FIG. 5A is drawn on the projection plane. However, an actually projected image is distorted as illustrated in FIG. 5B.

Figure 6:
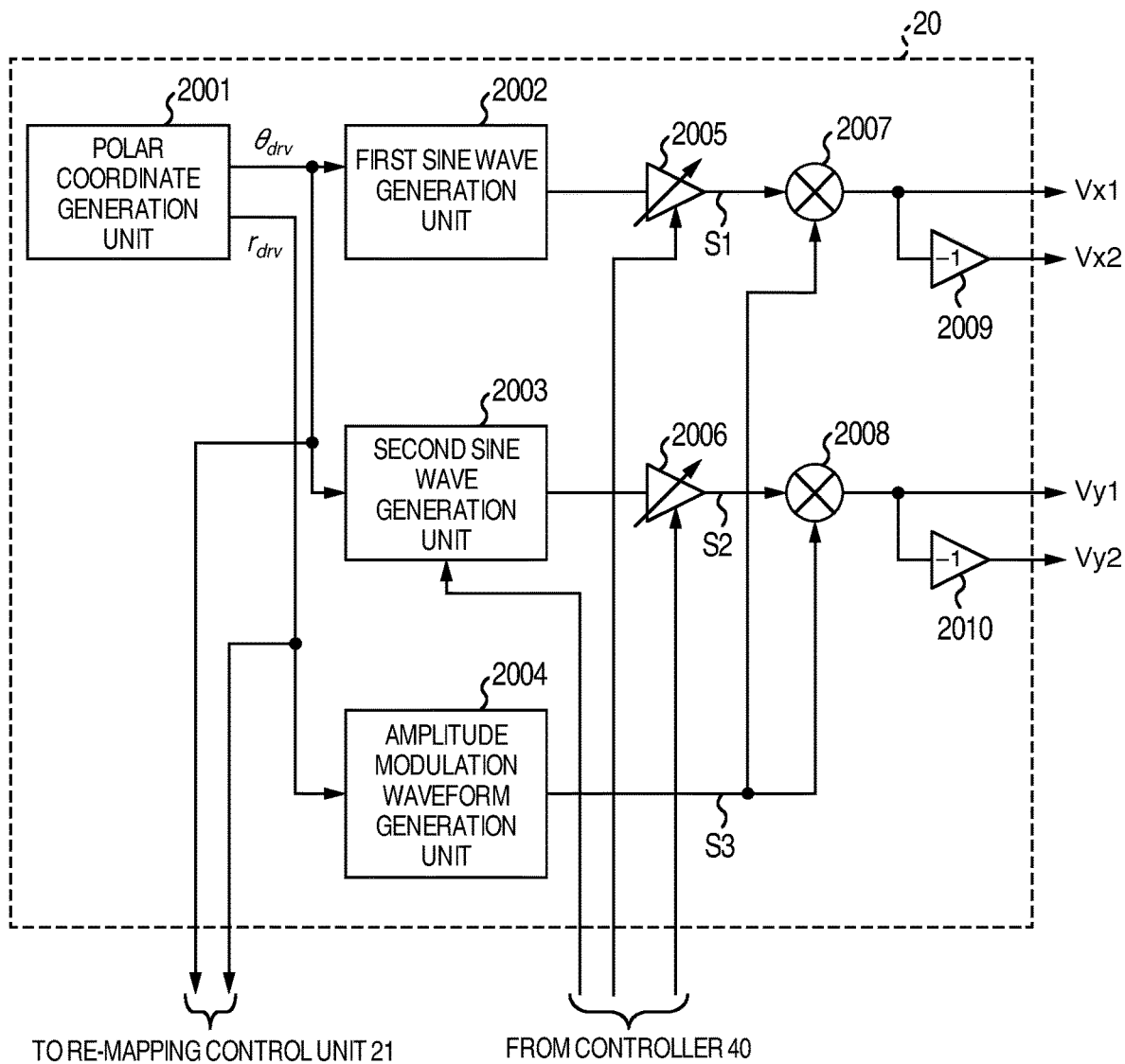
FIG. 6 is a block diagram illustrating a configuration of a driving signal generation unit 20 of the first embodiment.

Subsequently, the configuration of the driving signal generation unit 20 in the present embodiment will be described with reference to FIG. 6. The driving signal generation unit 20 includes a polar coordinate generation unit 2001, a first sine wave generation unit 2002, a second sine wave generation unit 2003, an amplitude modulation waveform generation unit 2004, a first variable gain 2005, a second variable gain 2006, a first multiplier 2007, a second multiplier 2008, a first inversion gain 2009, and a second inversion gain 2010. The driving signal generation unit 20 outputs four driving signals VX1, VX2, VY1, and VY2. The polar coordinate generation unit 2001 generates a radius $r_{drv}$ and an angle $\theta_{drv}$ so that the trajectory of the laser on the projection plane draws a spiral trajectory. The radius $r_{drv}$ and the angle $\theta_{drv}$ are a time function, and a frequency at which the angle $\theta_{drv}$ rotates from 0 degrees to 360 degrees substantially coincides with the resonant frequency of the cantilever including the light guide path 102. The radius $r_{drv}$ and the angle $\theta_{drv}$ are transmitted to the re-mapping control unit 21.

The first sine wave generation unit 2002 generates a first sine wave based on the angle $\theta_{drv}$. The amplitude of the first sine wave output from the first sine wave generation unit 2001 is changed by the first variable gain 2005, resulting in an X-axis driving sine wave S1. The magnification of the amplitude in the first variable gain 2005 is instructed from the controller 40. The second sine wave generation unit 2003 generates a second sine wave having a predetermined phase difference from the first sine wave, based on the angle $\theta_{drv}$ and a command signal from the controller. The amplitude of the second sine wave output from the second sine wave generation unit 2003 is changed by the second variable gain 2006, resulting in a Y-axis driving sine wave S2. The magnification of the amplitude in the second variable gain 2006 is instructed from the controller 40.

The amplitude modulation waveform generation unit 2004 generates an amplitude modulation waveform S3 based on the radius $r_{drv}$. The first multiplier 2007 multiplies the X-axis driving sine wave S1 and the amplitude modulation waveform S3. The multiplied waveform has a voltage Vx1, and the amplitude thereof is inverted at the first inversion gain 2009, and thus, the inverted waveform has a voltage Vx2. In addition, the second multiplier 2008 multiplies the Y-axis driving sine wave S2 and the amplitude modulation waveform S3. The multiplied waveform has a voltage Vy1, and the amplitude thereof is inverted at the second inversion gain 2010, and thus, the inverted waveform has a voltage Vy2. In the present embodiment, the voltages Vx1, Vx2, Vy1, and Vy2 are amplified by the amplification unit 30 and become Vdx1, Vdx2, Vdy1, and Vdy2, respectively. These voltages are applied to the electrodes provided in the vibration unit 101 of the optical scanning unit 10. As described above, sine waves having different polarities are applied to mutually opposite electrodes among the electrodes provided in the vibration unit 101 of the present embodiment. Under this condition, the vibration unit 101 may be configured so as to be displaced along the X-axis illustrated in FIG. 2 based on the amounts of voltages Vx1 and Vx2, and to be also displaced along the Y-axis illustrated in FIG. 2 based on the amounts of voltages Vy1 and Vy2. Since the vibration unit 101 of the present embodiment is the piezoelectric element, the above configuration can be realized according to a direction in which the polarization of the piezoelectric element is performed.

Figure 7:
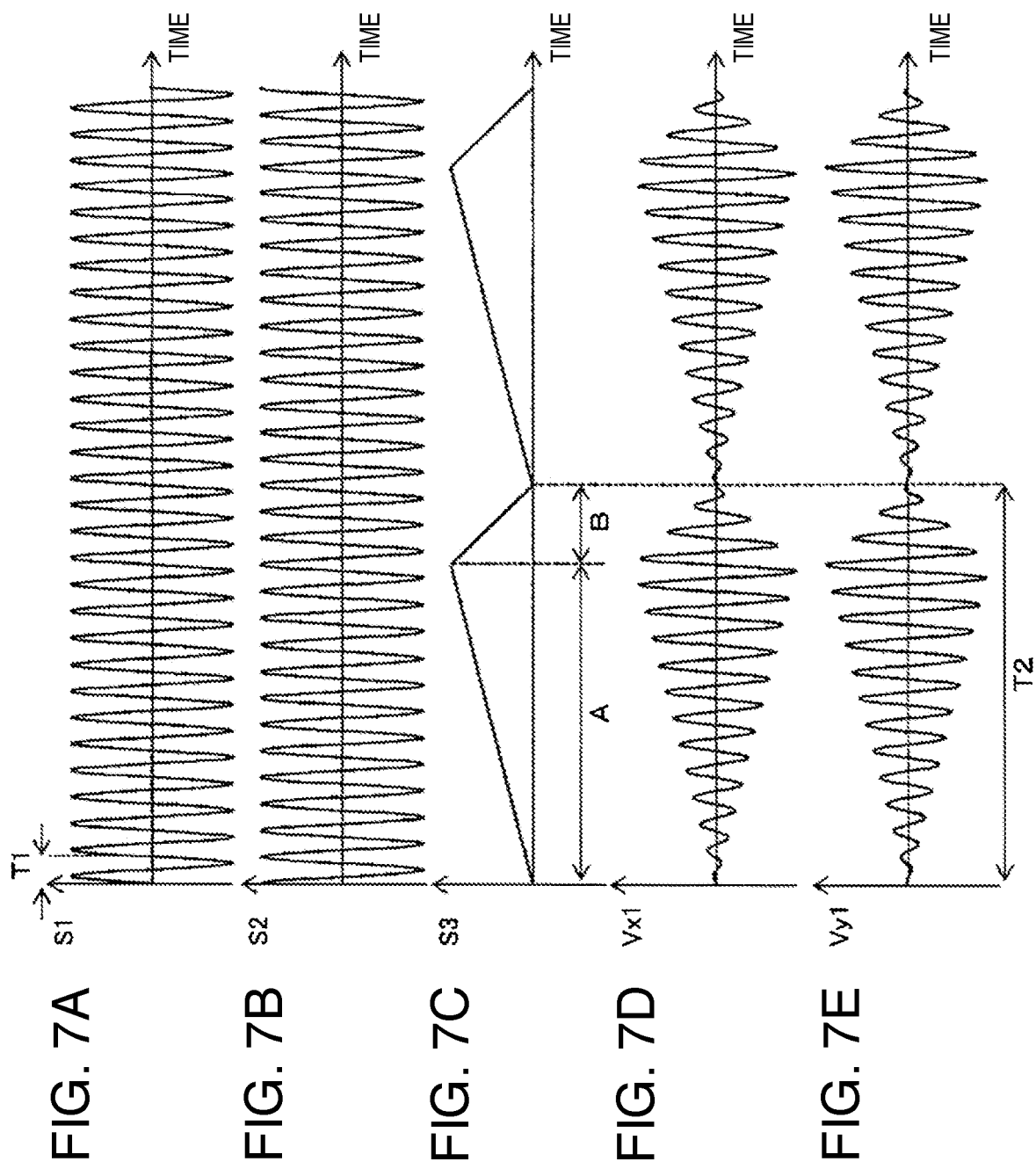
FIGS. 7A to 7E are diagrams illustrating a waveform inside the driving signal generation unit 20 of the first embodiment.

The waveform inside the driving signal generation unit 20 in the present embodiment will be described with reference to FIG. 7. FIG. 7A shows a first sine wave S1, FIG. 7B shows a second sine wave S2, and FIG. 7C shows an amplitude modulation waveform S3. Both the first sine wave S1 and the second sine wave S2 are E-sine waves having the same period T1. The first sine wave S1 and the second sine wave S2 have different phases by a predetermined phase difference instructed from the controller 40, and the phase difference is about 90 degrees. That is, the second sine wave S2 may be called a cosine wave. In addition, the first sine wave S1 and the second sine wave S2 may have different amplitudes according to the magnification of the amplitude in the first variable gain 2005 and the second variable gain 2006.

In addition, in the amplitude modulation waveform S3, the same waveform is repeated at each period T2. Further, the amplitude increases linearly from 0 at the period A illustrated in FIG. 7 and the amplitude decreases linearly and returns to 0 at the period B. The period A indicates a laser turn-on period, and the period B indicates a laser turn-off period.

FIG. 7D shows a waveform of the voltage Vx1, and FIG. 7E shows a waveform of the voltage Vy1. The period T2 corresponds to one frame in image display. The period T2 of the amplitude modulation waveform S3 in the present embodiment is a value different from an integer multiple of the period T1. In the present embodiment, it is assumed that the phase difference of the second sine wave, the magnification in the first variable gain 2005, and the magnification in the second variable gain 2006 are all instructed from the controller 40, and the values thereof are not changed during the period T2. That is, the voltage Vx1 and the voltage Vy1 have the constant phase difference at any timing, and a amplitude ratio is constant at any timing (that is, the ratio of the magnification in the first variable gain 2005 to the magnification in the second variable gain 2006).

By determining the period T1 so as to correspond to the resonant frequency of the cantilever having the adhesive part 103 as the fixed end and the emission end 102a of the light guide path 102 as the free end, the cantilever including the light guide path 102 resonates and the displacement of the emission end 102a increases. As a result, the amplitude of the trajectory of the laser can increase. Due to the above configuration, the driving signal generation unit 20 in the present embodiment generates a driving signal for drawing a spiral trajectory with a simple configuration.

Figure 8:
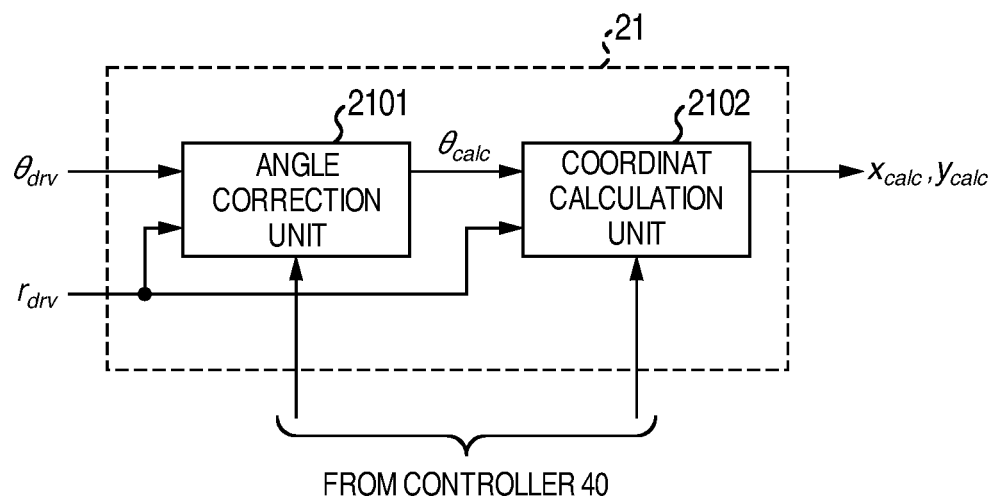
FIG. 8 is a block diagram illustrating a configuration of a re-mapping control unit 21 of the first embodiment.

Subsequently, the configuration of the re-mapping control unit 21 in the present embodiment will be described with reference to FIG. 8. The re-mapping control unit 21 includes an angle correction unit 2101 and a coordinate calculation unit 2102. The angle correction unit 2101 performs the following calculation by using $\theta_{drv}$ and $r_{drv}$ from the driving signal generation unit 20 and outputs a corrected angle $\theta_{calc}$.

[Math. 1]

$$\theta_{calc} = \theta_{drv} + f(r_{drv}) \quad \text{(Math. 1)}$$

The coordinate calculation unit 2102 is configured to calculate and output the following xcalc and ycalc.

[Math. 2]

$$x_{calc} = \text{round}(a(r_{drv}) \cdot r_{drv} \cos(\theta_{calc})) \quad \text{(Math. 2)}$$

[Math. 3]

$$y_{calc} = \text{round}(b(r_{drv}) \cdot r_{drv} \sin(\theta_{calc})) \quad \text{(Math. 3)}$$

Here, the function round ( ) represents rounding off to an integer.

In the above equations, f(r), a(r), and b(r) are functions with a radius r as an argument, and the functions are instructed from the controller 40. xcalc and ycalc are coordinate information for correcting the distortion of the projected image. As a result, among pieces of image information stored in the display image storage memory 32, gradation data of the image corresponding to the coordinates (xcalc, ycalc) is read out. The gradation data is information related to the colors of the pixels constituting the image, and is, for example, data of 256 gradations for each channel of red, green, and blue colors that are three primary colors. In the present specification, the gradation values of the respective colors are represented by R, G, and B, and the gradation data is represented by (R, G, B).

Figure 9A:
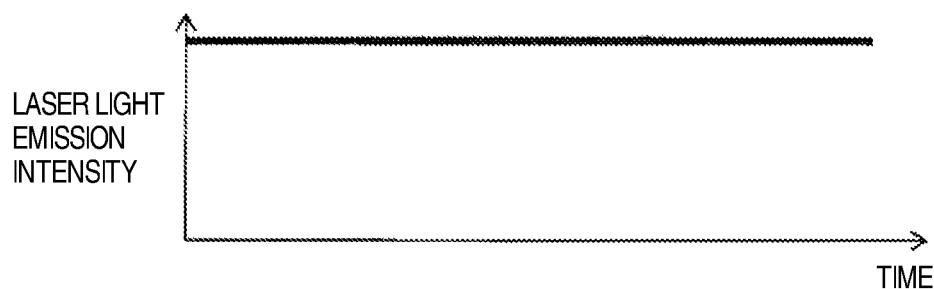
FIG. 9A is a diagram for describing a case where a light emission control unit 22 normally emits light in the first embodiment.
Figure 9B:
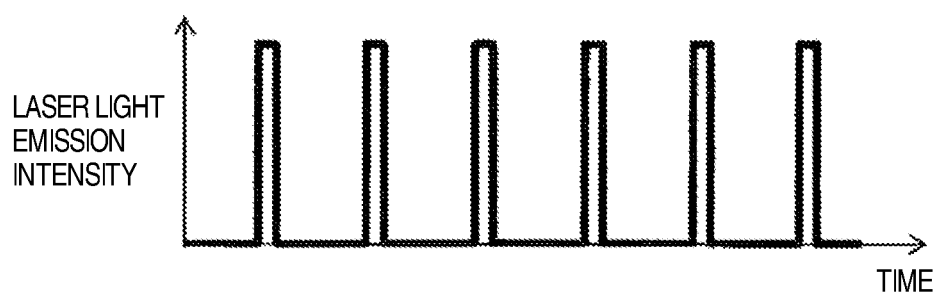
FIG. 9B is a diagram for describing a case where the light emission control unit 22 reduces brightness.

Subsequently, the operation of the light emission control unit 22 will be described. The light emission control unit 22 in the present embodiment receives the gradation data (R, G, B) supplied from the display image storage memory 32 and controls the light emission of laser based on the received gradation data (R, G, B). Furthermore, the light emission control unit 22 in the present embodiment has a function of correcting brightness according to $r_d$ output from the driving signal generation unit 20, based on the instruction from the controller 40. It is also possible not to perform the correction of the brightness according to the instruction from the controller 40. The correction of the brightness in the present embodiment is performed by changing the lighting frequency of the laser. FIGS. 9A and 9B are diagrams for describing the operation of the light emission control unit 22 in the present embodiment. A horizontal axis is the time, and a vertical axis is light emission intensity of laser. FIG. 9A illustrates a normal light emission state. On the other hand, FIG. 9B illustrates a light emission state when the brightness is reduced. As illustrated in FIG. 9B, when the brightness is reduced, the brightness is lowered by decreasing the lighting frequency (duty) of the laser rather than uniformly decreasing the light emission intensity of the laser. It is assumed that the period of the flickering of FIG. 9B is high enough to be invisible to the human eyes. Due to the above configuration, the light emission of the laser is controlled in synchronization with the scanning of the light, and the brightness is made uniform regardless of the radius.

The flowchart of the controller 40 in the imaging device 1 of the present embodiment is illustrated in FIG. 10. When the imaging device 1 start operating (step S1001), the controller 40 reads information necessary for processing of each unit constituting the imaging device 1 from the storage unit 41 (step S1002). Among them, information on the functions f(r), a(r), and b(r), the magnification in the first variable gain 2005 or the magnification in the second variable gain 2006, the phase difference of the second sine wave generation unit 2003, and the like are included.

Subsequently, the controller 40 determines whether there is a display start instruction from the external control device 50 through the input/output control circuit 42 (step S1003). When there is no display start instruction (No in step S1003), the process returns to step S1003. When there is the display start instruction (Yes in step S1003), the controller 40 outputs an instruction to the driving signal generation unit 20 and starts the output of the driving signal (step S1004). In the present embodiment, the output is started by setting a nonzero value as the magnification in the first variable gain 2005 and the magnification in the second variable gain 2006. In this case, the value to be set is a setting value read from the storage unit 41 in step S1002.

Subsequently, the controller 40 outputs an instruction to the re-mapping control unit 21 and instructs the start of the re-mapping control (step S1005). The controller 40 transmits information on the function used for calculation in the re-mapping control unit 21, and re-mapping control is started. In addition, the mechanism in which the gradation data of the pixel corresponding to the coordinates (xcalc, ycalc) among pieces of image information stored in the display image storage memory 32 is read out is implemented by hardware, and the reading of the gradation data of the pixel in step S1005 is also started.

Subsequently, the controller 40 outputs an instruction to the light emission control unit 22 and instructs the start of the light emission control of the laser (step S1006). In this manner, the image is displayed. The process of storing an image signal, which is input from the external control device 50 through the input/output control circuit 42, in the display image storage memory 32 is implemented by hardware, and the storing of the image signal in the display image storage memory 32 is continuously performed constantly from the immediately after the indication of the trajectory to the imaging device 1. The following is a flow when the imaging device 1 ends the operation. The controller 40 determines whether there is a display end instruction from the external control device 50 through the input/output control circuit 42 (step S1007). When there is no display end instruction (No in step S1007), the process returns to step S1007.

When there is the display start instruction (Yes in step S1007), the controller 40 outputs an instruction to the light emission control unit 22, and instructs the end of the light emission control of the laser (step S1008). After step S1008, the operation end of each unit is instructed (step S1009), and the operation is ended (step S1010). Here, each unit is, for example, the driving signal generation unit 20 and the re-mapping control unit 21.

Figure 11A:
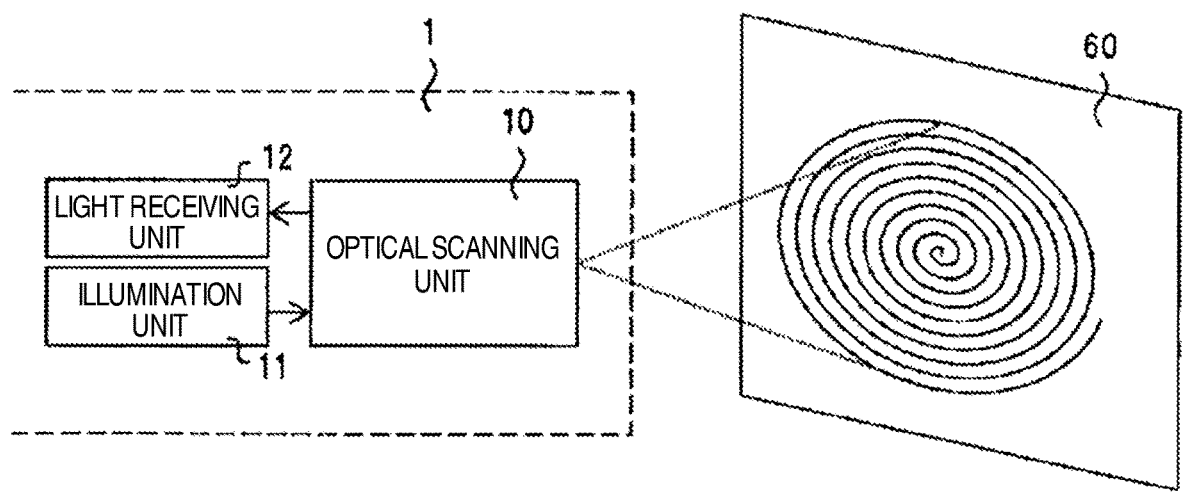
FIG. 11A is a diagram for describing an example of a method of adjusting distortion parameters in the first embodiment.
Figure 11B:
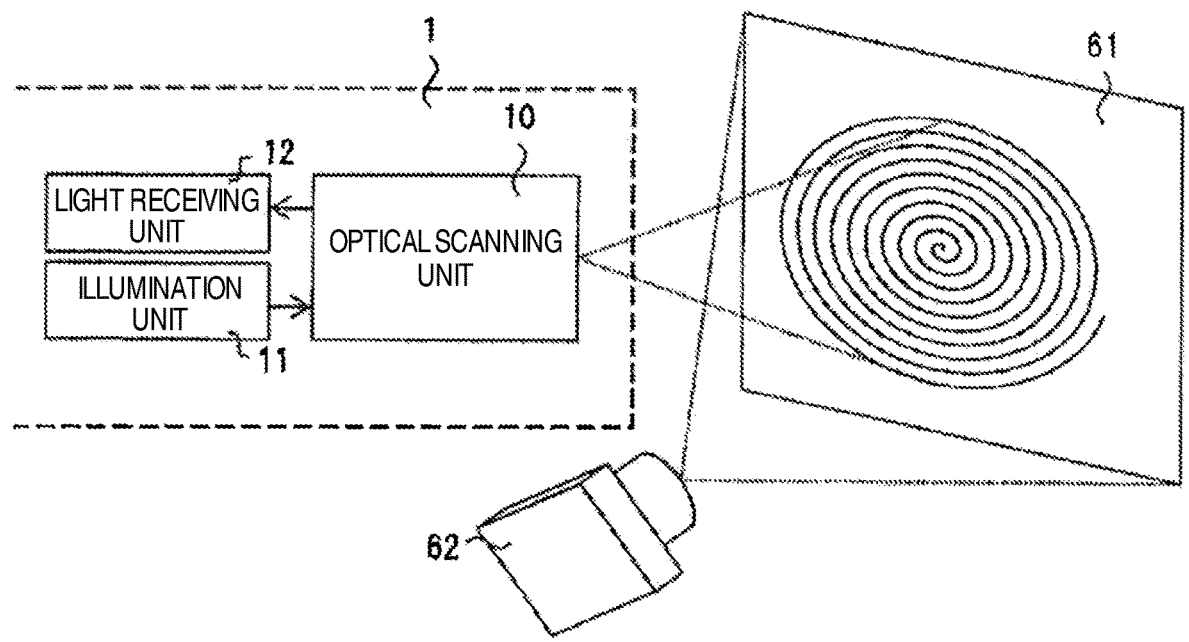
FIG. 11B is a diagram for describing another example of a method of adjusting distortion parameters in the first embodiment.

Next, a method of determining the functions f(r), a(r), and b(r) will be described. These functions in the present embodiment are adjusted at the time of manufacturing the imaging device 1. These adjustments at the time of manufacturing are hereinafter referred to as distortion parameter adjustment. The distortion parameter adjustment is performed by, for example, a method illustrated in FIGS. 11A and 11B. FIGS. 11A and 11B show the method of adjusting the distortion parameters. In FIG. 11A, a Position Sensing Device (PSD) 60 is placed on a projection plane, and acquires the scanning trajectory of the laser emitted from the optical scanning unit 10 as a voltage. In addition, FIG. 11B is another embodiment in which the scanner 61 is placed on the projection plane and the camera 62 photographs the projection plane. In either case, the PSD 60, the scanner 61, or the camera 62 used for the adjustment at the time of manufacturing is different from the imaging device 1. In the following description, the configuration of FIG. 11A will be described by way of example.

Next, the flowchart of the distortion parameter adjustment will be described with reference to FIG. 12. When the distortion parameter adjustment is started (step S1201), an adjustment pattern is input to the imaging device 1 as the image signal (step S1202). The adjustment pattern is, for example, the image of FIG. 5A.

Subsequently, the operation of the imaging device 1 is started (step S1203). Due to this, the light is scanned on the PSD 60, and the distorted image as illustrated in FIG. 5B is displayed. Subsequently, the coordinates of the intersection point of the adjustment pattern on the PSD 60 is acquired (step S1204). Based on the coordinates of the intersection point, the function f(r) is determined (step S1205), and the function a(r) and b(r) are determined (step S1206). After step S1206, information about the functions f(r), a(r), and b(r) is stored in the storage unit 41 (step S1207), and the distortion parameter adjustment is ended (step S1208).

Next, the effects of the present embodiment will be described. The first effect of the present embodiment is that the distortion of the projected image can be satisfactorily corrected. As described with reference to FIGS. 5A and 5B, when the image as illustrated in FIG. 5A is projected as the projected image, the actually projected image is distorted as illustrated in FIG. 5B. The inventors specified the image distortion method and classified the distortion existing in the projected image into two types. Further, the inventors found that an appropriate correction was performed on each of the two types of distortion, and an excellent projected image without distortion could be realized. Hereinafter, the characteristics of the two types of image distortion found by the inventors will be described.

The first image distortion is a distortion in a rotating direction as indicated by F in FIG. 5B. The distortion in the rotating direction has uniform characteristics regardless of the rotating angle. The second image distortion is a distortion in which the trajectory of the inner periphery is elliptical when the amplitude modulation is performed while drawing a spiral trajectory under the condition that becomes a circle at the outermost periphery. As indicated by a and b in FIG. 5B, the trajectory that should be originally a circle on the inner periphery is an ellipse whose lengths of the major axis a and the minor axis b are different from each other. Hereinafter, this distortion is referred to as an inner peripheral elliptical distortion. This distortion has characteristics that the ellipticity changes according to the radius.

In the present embodiment, the re-mapping control unit 21 performs appropriate correction on each of the two type of image distortion. First, the angle correction unit 2101 can perform correction based on (Math. 1) on the distortion in the rotating direction. The rotating angle of the coordinates acquiring pixel information from the display image storage memory 32 is corrected based on (Math. 1). This correction is determined by the function f(r) instructed from the controller 40. That is, the information on the function f(r) is previously stored in the storage unit 41 of the present embodiment, and the controller 40 reads the information from the storage unit 41 and outputs the instruction to the angle correction unit 2101.

Subsequently, the coordinate calculation unit 2102 performs on the inner and outer ellipticity distortion based on (Math. 2) and (Math. 3). Based on (Math. 2) and (Math. 3), the conversion of the coordinates acquiring pixel information from the display image storage memory 32 is corrected by changing from a circle to an ellipse. This correction is determined based on the functions a(r) and b(r) instructed from the controller 40. The information on these functions is similarly stored in the storage unit 41.

Due to the above configuration, even in a case where the image distortion occurs as illustrated in FIG. 5B when the correction is not performed, the imaging device 1 according to the present embodiment can realize the projected image without distortion as illustrated in FIG. 5A. In this manner, it is possible to satisfactorily correct the distortion of the projected image. In the present embodiment, the correction was performed with respect to the distortion in the rotating direction by the angle correction unit 2101, and the correction was performed with respect to the inner and outer ellipticity distortion by the coordinate calculation unit 2102. However, according to the configuration of the optical scanning unit 10, there is a possibility that one of the distortion in the rotating direction and the inner and outer ellipticity distortion will appears conspicuously. In such a case, at least one of the angle correction unit 2101 and the coordinate calculation unit 2102 may perform correction.

Figure 13:
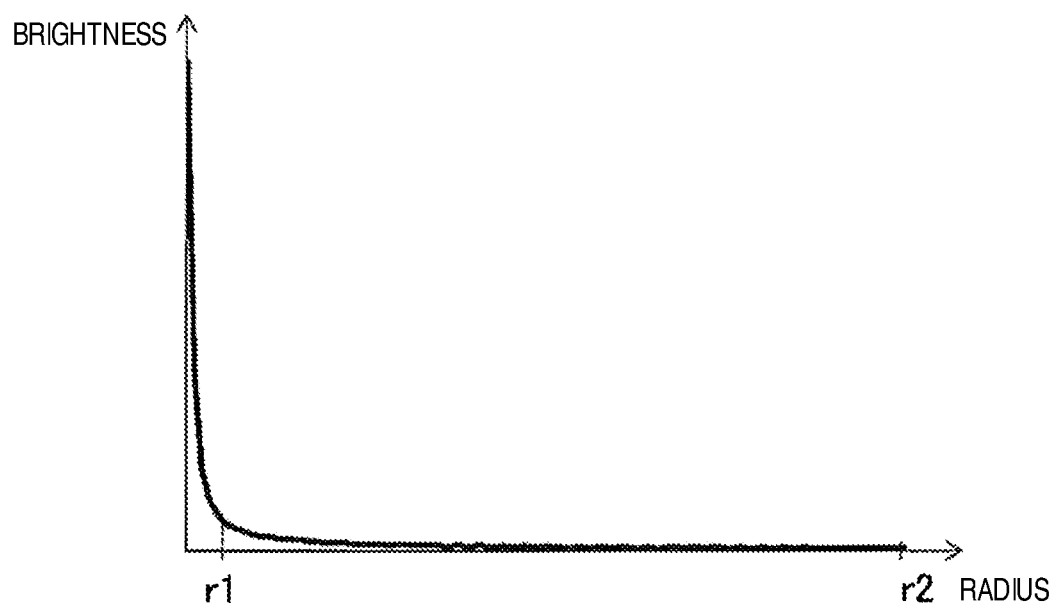
FIG. 13 is brightness characteristics in the first embodiment.

The second effect of the present embodiment is that it is possible to make the brightness distribution uniform in the projected image. Since the scanning of the light in the present embodiment is performed at the resonant frequency of the cantilever including the light guide path 102, one cycle of the inner periphery of the spiral trajectory and one cycle of the outer periphery are one cycle at the same time. Therefore, the inventors found that the brightness increased at the inner periphery. FIG. 13 shows the brightness calculation result obtained by simulation. Hereinafter, this characteristic is referred to as brightness characteristic. This simulation makes the light emission intensity of the laser constant. In FIG. 13, the radius r1 is a predetermined radius of the inner periphery, and the radius r2 is a radius of the outermost periphery. When the brightness at the outermost periphery is 1, for example, the brightness at the radius r1 of the inner periphery is 10 times the brightness of the outermost periphery. In addition, the brightness at the innermost periphery is more than 100 times.

Figure 14:
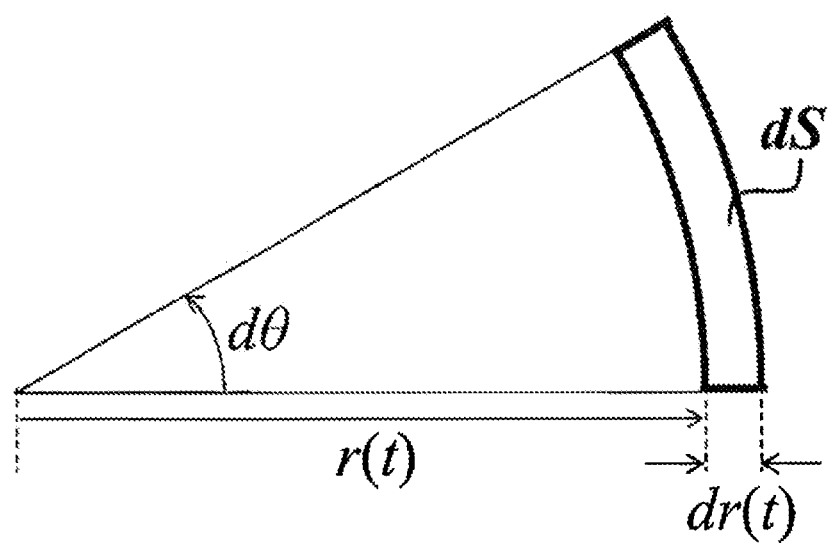
FIG. 14 is a diagram illustrating a minute area dS drawn by a trajectory of a laser for a minute time dt in the first embodiment.

The brightness characteristic can be formulated as follows. FIG. 14 illustrates a minute area dS drawn by the trajectory of laser for a minute time dt. r(t) represents a radius of a spiral trajectory with time as an argument. In the present embodiment, r(t) is a function corresponding to the waveform in the period A in the amplitude modulation waveform S3 generated by the amplitude modulation waveform generation unit 2004, and is a function proportional to the time.

The minute area dS is calculated by (Math. 4).

[Math. 4]

$$dS = |r(t)d\theta \cdot dr(t)| \qquad \text{(Math. 4)}$$

In a case where the light emission intensity of the laser is made constant, the light intensity C is constant when the light intensity of the minute area dS irradiated by the laser in the period of the minute time dt is C. Accordingly, when the brightness is expressed by L, the equation is as follows.

[Math. 5]

$$dL = \frac{C}{dS} \qquad \text{(Math. 5)}$$

[Math. 6]

$$L = \int C \cdot \frac{1}{dS} dt \propto \left| \frac{1}{r(t)} \cdot \frac{dt}{dr(t)} \right| \qquad \text{(Math. 6)}$$

That is, the brightness can be made uniform by performing the correction of the brightness taking into account the brightness characteristics formulated by (Math. 6). Here, in the present embodiment, since r(t) is the function proportional to the time, the brightness equation is simplified as follows.

[Math. 7]

$$L \propto \frac{1}{|r(t)|} \qquad \text{(Math. 7)}$$

That is, the characteristics of FIG. 13 are a function proportional to the radius, and the value at the radius of the outermost peripheral is normalized to 1. For example, since the brightness at the radius r1 is 10 times the brightness at the radius r2 of the outermost periphery, r1 is a value of 1/10 of r2.

In order to correct the difference of brightness in the inside and the outside, the light emission control unit 22 performs brightness correction by taking into account the characteristics of FIG. 13. For example, when taking r1 that is 1/10 of the radius r2 of the outermost periphery, the correction of reducing the brightness to 1/10 is performed. After that, as described with reference to FIG. 9, the correction of reducing the brightness is performed by reducing the laser lighting frequency to 1/10. That is, FIG. 9A corresponds to the light emission state at the outermost periphery, and FIG. 9B corresponds to the light emission state at the inner periphery.

When the brightness frequency (duty) is represented by D, the brightness characteristics of (Math. 6) can be corrected by determining the light emission frequency by using the following equation.

[Math. 8]

$$D \propto \left| r(t) \cdot \frac{dr(t)}{dt} \right| \qquad \text{(Math. 8)}$$

Furthermore, since r(t) in the present embodiment is the function proportional to the time, the light emission frequency equation is simplified as follows.

[Math. 9]

$$D \propto |r(t)| \qquad \text{(Math. 9)}$$

Since the brightness is reduced by lowering the laser lighting frequency instead of uniformly lowering the light emission intensity of the laser, it is possible to realize the reduction of brightness without damaging the gradation. For example, in the case of the method of uniformly reducing the light emission intensity of the laser, or in the case of reducing the brightness of the pixel having the brightness of 120 to 1/100, it is necessary to control the light emission amount to below the resolution of the laser driver 31. On the other hand, an operation clock of the electric circuit constituting the light emission control unit 22 is high, and it is possible to emit light with low brightness corresponding to the brightness of 1.2. In this manner, according to the method of the present embodiment, it is possible to maintain the gradation over the entire projected image.

Furthermore, when the light emission control unit 22 of the present invention performs the brightness correction by taking into account the characteristics of FIG. 13, the light emission control unit 22 performs correction based on the radius $r_{drv}$ from the driving signal generation unit 20. That is, in the present embodiment, r(t) in (Math. 8) is a radius $r_{drv}$ output from the driving signal generation unit 20. The re-mapping control unit 21 calculates xcalc and ycalc, but the radius $r_{calc}$ calculated from the coordinates and expressed by the following equation should not be used.

[Math. 10]

$$r_{calc} = \sqrt{x_{calc}^2 + y_{calc}^2} \qquad \text{(Math. 10)}$$

The reason for this is that the correction performed by calculating the coordinates (xcalc, ycalc) in the re-mapping control unit 21 does not change the trajectory of the laser. In the present embodiment, the correction is performed on the coordinates acquiring pixel information from the display image storage memory 32 while the trajectory of the laser is distorted. Since the trajectory of the laser remains distorted, the brightness is substantially the same on the elliptical line illustrated in FIG. 5B (strictly speaking, since there is a spiral shape, there is a brightness difference). As in the configuration of the present embodiment, it is possible to perform appropriate brightness correction by correcting the brightness based on the radius $r_{drv}$ from the driving signal generation unit 20.

Therefore, the light emission control unit 22 of the present embodiment changes the laser lighting frequency in proportion to the radius $r_{drv}$. This is applied to the case where the radius $r_{drv}$ changes linearly. If generalized according to (Math. 8), when an absolute value of the product of the time derivative of the radius $r_{drv}$ and the radius $r_{drv}$ is defined as a light emission frequency function, the light emission control unit 22 changes the laser lighting frequency in proportion to the light emission frequency function.

Furthermore, the light emission control unit 22 in the present embodiment may change the laser lighting frequency so as to be roughly proportional to the light emission frequency function, by taking into account the laser characteristics. This is because, due to the laser characteristics, the light emission frequency is not completely proportional to the brightness actually observed by the human eyes. Therefore, it is preferable to use a function in which the laser lighting frequency controlled by the light emission control unit 22 of the present embodiment is slightly different from the light emission frequency function. More specifically, the laser lighting frequency is changed so as to be proportional to the function obtained by multiplying the laser characteristics by the light emission frequency function. Therefore, it is possible to perform appropriate brightness correction.

As apparent from the above, the radius $r_d$ generated by the polar coordinate generation unit 2001 does not mean the radius in the final spiral trajectory. The radius $r_{drv}$ may be read as a value corresponding to the number of circles drawn from the innermost periphery to the outermost periphery or from the outermost periphery to the innermost periphery of the spiral trajectory.

The third effect of the present embodiment is that it is possible to eliminate or reduce the defects of pixels. The period T2 of the amplitude modulation waveform S3 of the present embodiment was a value different from the integer multiple of the period T1. As a result, the trajectory of the laser draws a slightly different trajectory for each circle. On the other hand, the coordinates for acquiring pixel information from the display image storage memory 32 are sequentially calculated at each circle by the re-mapping control unit 21. As a result, even if there is a pixel defect in a single circle, it is possible to eliminate pixel defects when viewed through a plurality of circles. If there are many pixel defects, it is possible to reduce pixel defects by the configuration of the present embodiment. As described above, according to the present embodiment, the imaging device having the function of displaying an image can appropriately display an image.

Second Embodiment

Figure 15:
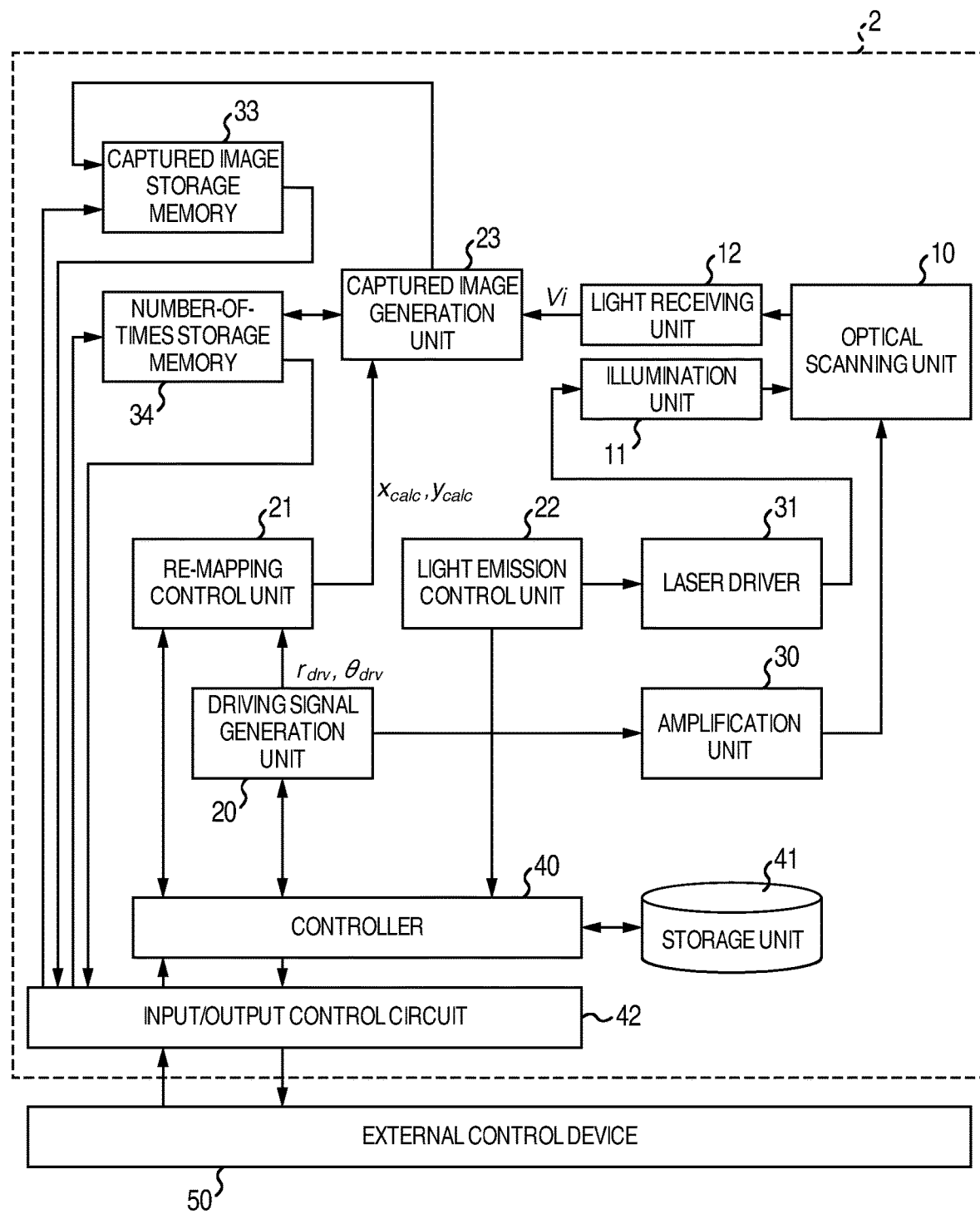
FIG. 15 is a block diagram illustrating a configuration of an imaging device 2 of a second embodiment.

The imaging device according to the first embodiment 1 has been configured to have at least the function of displaying the image. The present embodiment is configured to have the function of projecting an image. FIG. 15 is a block diagram illustrating an imaging device 2 having an optical scanning unit 10. The same numbers are assigned to the same elements as those of FIG. 1 that is the block diagram of the first embodiment, and a description thereof will be omitted. The second embodiment differs from the configuration of the first embodiment in a captured image generation unit 23, a captured image storage memory 33, and a number-of-times-of-addition storage memory 34, and also, a partial connection state between blocks or the contents of instructions from the controller 40.

Information Vi on return light is output from the light receiving unit 12 and is input to the captured image generation unit 23. The plane irradiate with light emitting the laser through the optical scanning unit 10 is referred to as a projection plane. The return light means that light strikes an object in the vicinity of the projection plane, and returns to the optical scanning unit 10. The light emission control unit 22 in the present embodiment receives gradation data (R, G, B) from the controller 40. The gradation data (R, G, B) transmitted by the controller 40 are data in which each channel of red, green, and blue has the maximum value and represents white color. In addition, in the configuration of the present embodiment, the light emission control unit 22 does not correct the brightness according to the instruction from the controller 40.

In the present embodiment, the captured image generation unit 23, the captured image storage memory 33, and the number-of-times-of-addition storage memory 34 provide a capturing function in which the light scanned by the scanning of the light in the optical scanning unit 10 is an image that strikes an object and returns back. Information on the finally captured image is stored in the captured image storage memory 33. Since the vertical and horizontal size of the finally obtained image is a predetermined value, the information is stored at an address of the captured image storage memory 33 associated with the coordinates on the image. The captured image generation unit 23 in the present embodiment has a function of integrating the intensity of the return light. The captured image generation unit 23 receives information Vi on the return light from the light receiving unit 12. In addition, the captured image generation unit 23 receives coordinates (xcalc, ycalc) output by the re-mapping control unit 21. The captured image generation unit 23 adds the input value at each predetermined timing and stores the addition result in the captured image storage memory 33. In addition, the number of times of additions is stored in the number-of-times-of-addition storage memory 34.

Figure 16:
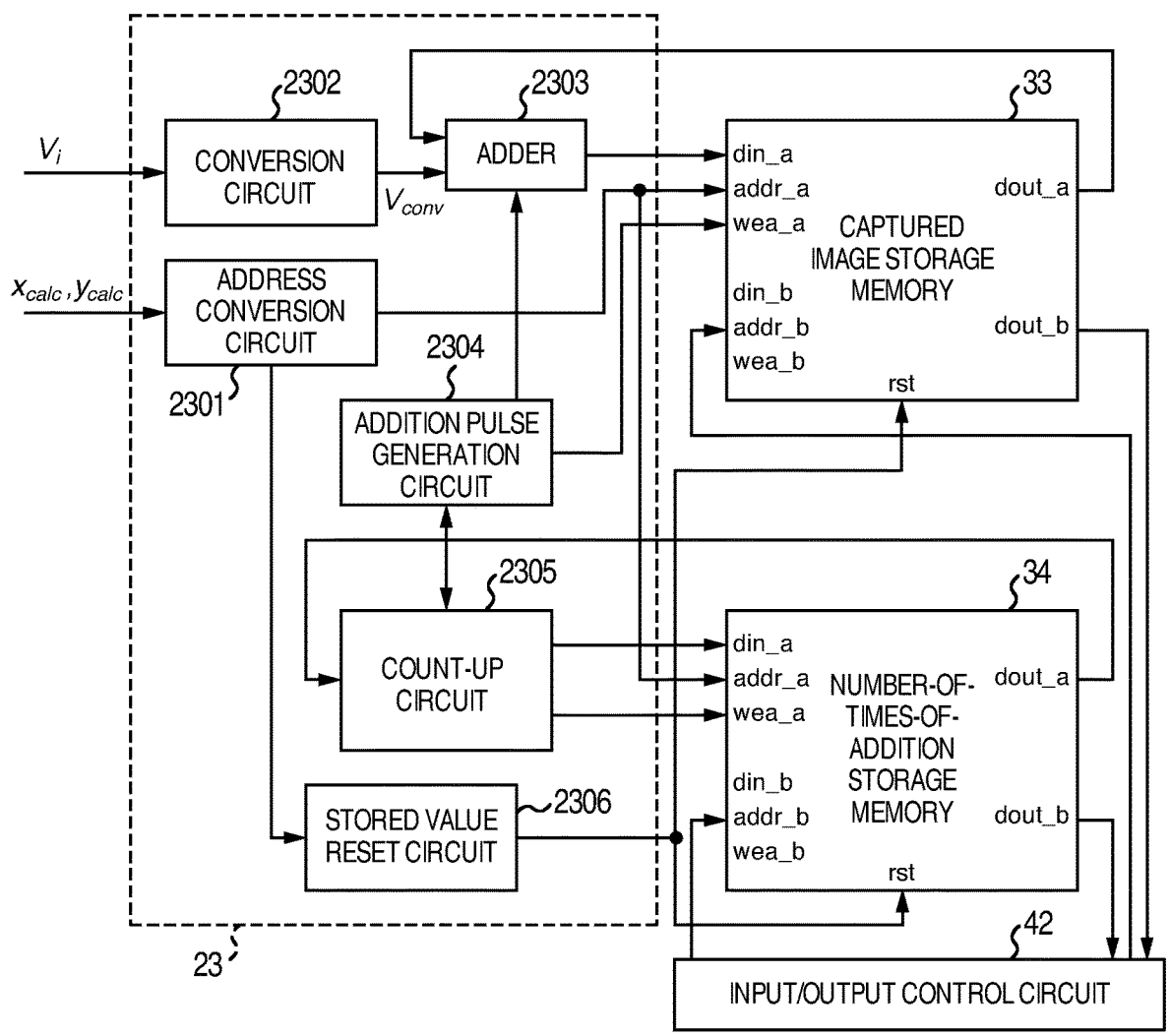
FIG. 16 is a diagram for describing a relationship between a configuration of a captured image generation unit 23 and related blocks in the second embodiment.

The relationship between the captured image generation unit 23 of the present embodiment and related blocks will be described with reference to FIG. 16. The captured image generation unit 23 includes an address conversion circuit 2301, a conversion circuit 2302, an adder 2303, an addition pulse generation circuit 2304, a count-up circuit 2305, and a stored value reset circuit 2306. The captured image generation unit 23 in the present embodiment is implemented as a hardware circuit configured by FPGA or the like, and operates based on a predetermined clock. In addition, the conversion circuit 2302 is a circuit for converting storage information $V_{conv}$ for storing the input value Vi in the captured image storage memory 33. In the present embodiment, the input value Vi is a value obtained by performing current-voltage conversion on the current output from the detector in the light receiving unit 12. Furthermore, in the present embodiment, the conversion circuit 2302 is an analog-to-digital converter. That is, the input value Vi corresponds to the light amount of the light received by the light receiving unit 12, and the converted value $V_{conv}$ is a value obtained by converting the value into a digital value.

The captured image storage memory 33 and the number-of-times-of-addition storage memory 34 are configured by, for example, true dual port RAM. The true dual port RAM has two completely independent access ports, each of which can be used for read/write operations. In addition, the captured image storage memory 33 and the number-of-times-of-addition storage memory 34 in the present embodiment have a reset terminal rst and has function of resetting the entire stored data to 0 by the input to the terminal thereof.

The address conversion circuit 2301 receives the coordinates (xcalc, ycalc) output by the re-mapping control unit 21, and outputs an address corresponding to the captured image storage memory 33. The output address information is connected to an address terminal of a port A of the captured image storage memory 33 and an address terminal of a port A of the number-of-times-of-addition storage memory 34. The data read from a data output terminal dout_a of the port A of the captured image storage memory 33 is input to the captured image generation unit 23 and is added to the converted value $V_{conv}$ by the adder 2303. After that, the timing of addition in the adder 2303 is controlled by a pulse output from the addition pulse generation circuit 2304. The addition result is connected to a data input terminal din_a of the port A of the captured image storage memory 33.

In addition, the addition pulse generation unit 2304 generates a signal to be input to a port A write enable terminal wea of the captured image storage memory 33. This signal is a signal that changes from high to low in one clock after the addition in the adder 2303 is completed. Due to the above configuration, the value obtained by adding the converted value $V_{conv}$ to the data read from the read terminal dout_a of the port A of the captured image storage memory 33 is stored again in the captured image storage memory 33. In addition, the addition pulse generation circuit 2304 may be configured to receive an addition stop instruction from the outside. Furthermore, the addition pulse generation unit 2304 also outputs an instruction to the count-up circuit 2305 whenever transmitting the pulse instructing addition to the adder 2303.

The data read from the data output terminal dout_a of the port A of the number-of-times-of-addition storage memory 34 is input to the count-up circuit 2305. In the count-up circuit 2305, based on the instruction from the addition pulse generation circuit 2304, 1 is added to the data read from the data output terminal dout_a of the port A of the number-of-times-of-addition storage memory 34. Therefore, in the period in which the coordinates output by the re-mapping control unit 21 are (xcalc, ycalc), the number of times of additions performed by the adder 2303 is counted. The counted result is connected to the data input terminal din_a of the number-of-times-of-addition storage memory 34.

Furthermore, the count-up circuit 2305 generates a signal to be input to the port A write enable terminal wea of the number-of-times-of-addition storage memory 34. This signal is a signal that changes from high to low in one clock after the count-up of the count-up circuit 2305 is completed. In addition, the count-up circuit 2305 may have a function of notifying other blocks that the number of times of additions has reached a predetermined number of times.

The addition pulse generation circuit 2304 repeats the above operation, and the result of adding the converted value $V_{conv}$ converted in the period in which the coordinates output by the re-mapping control circuit 21 is (xcalc, ycalc) is stored at the address corresponding to the captured image storage memory 33. Furthermore, the number of times of additions in the period in which the coordinates output from the re-mapping control unit 21 are (xcalc, ycalc) is stored at the address corresponding to the number-of-times-of-addition storage memory 34.

In addition, the stored value reset circuit 2306 outputs a signal for resetting the values stored in the captured image storage memory 33 and the number-of-times-of-addition storage memory 34, by using the address information output by the address conversion circuit 2301. The reset signal output by the stored value reset circuit 2306 is connected to an rst terminal of the captured image storage memory 33 and an rst terminal of the number-of-times-of-addition storage memory 34.

The stored value reset circuit 2306 of the present embodiment outputs the reset signal when the address information output by the address conversion circuit 2301 coincides with a predetermined address. Therefore, the result of adding the converted value $V_{conv}$ converted in the period in which the coordinates output by the re-mapping control unit 21 are (xcalc, ycalc) is during one frame in the captured image storage memory 33. Furthermore, the number of times of additions performed in the period in which the coordinates output by the re-mapping control unit 21 are (xcalc, ycalc) is stored for one frame in the number-of-times-of-addition storage memory 34.

Address terminals addr_b of the ports B of the captured image storage memory 33 and the number-of-times-of-addition storage memory 34 are connected to the signal from the input/output control circuit 42, and data output terminals dout_b of the ports B are connected to the input/output control circuit 42. As a result, the external control device 50 can acquire the data stored in the captured image storage memory 33 and the number-of-times-of-addition storage memory 34 through the input/output control circuit 42. In the external control device 50, the average value of the converted values $V_{conv}$ is acquired by dividing the value of the captured image storage memory 33 stored at a certain address by the value of the number-of-times-of-addition storage memory 34 stored at the same address. In the case of the configuration of the present embodiment, it is possible to obtain the average values of the converted value $V_{conv}$ in one frame.

In the present embodiment, the operation of dividing the value of the captured image storage memory 33 by the value of the number-of-times-of-addition storage memory 34 stored at the same address is performed outside the imaging device 2, but the operation may also be performed inside the imaging device 2 by providing a division circuit to the inside of the imaging device 2. In this case, the external control device 50 can directly receive the average value of the converted values $V_{conv}$ through the input/output control circuit 42. In addition, there are various configurations for obtaining finally obtaining the average value of the converted values $V_{conv}$ converted in the period in which the coordinates output by the re-mapping control unit 21 are (xcalc, ycalc). The configuration of the captured image generation unit 23 of the present embodiment is only an example.

In addition, in the present embodiment, since the conversion circuit 2302 is a simple analog-to-digital conversion circuit, the input value Vi and the converted value $V_{conv}$ can be regarded as the same in the abstracted expression. In that case, "the average of the converted values $V_{conv}$ converted in the period in which the coordinates output by the re-mapping control unit 21 are (xcalc, ycalc)" may be expressed as "the average value of the input value Vi input in the period in which the coordinates output by the re-mapping control unit 21 are (xcalc, ycalc).

Next, the effects of the present embodiment will be described. The first effect of the present embodiment is that the distortion of the projected image can be satisfactorily corrected. This is the same as the first effect of the first embodiment. That is, by performing appropriate correction on each of the two types of image distortion in the re-mapping control unit 21, the return light can be arranged at the correct coordinates and stored in the captured image storage memory 33. Even when the re-mapping control unit 21 in the first embodiment performs the capturing, it can be used as it is. Therefore, the distortion parameter adjustment in the case of the imaging device 2 having the function of projecting the image may be performed in the same manner as in the first embodiment.

Figure 17:
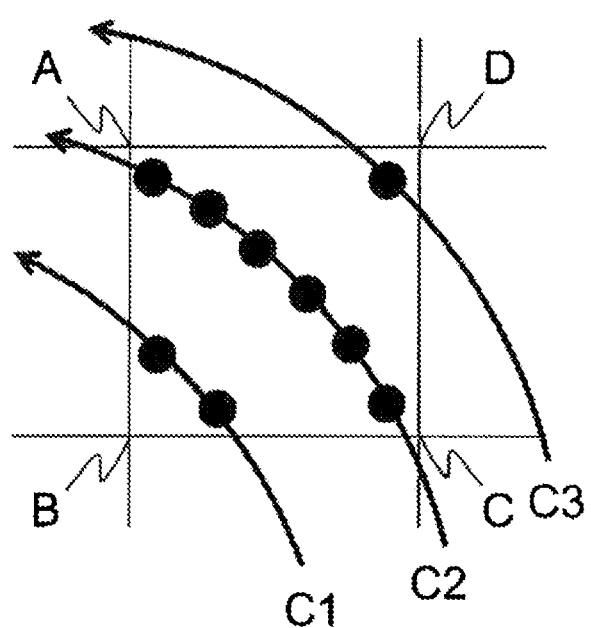
FIG. 17 is a diagram for describing a trajectory of light on a projection plane in the second embodiment.

The second effect of the present embodiment is that an S/N of the captured image can be improved. The relationship between the trajectory of the light on the projection plane and the region on the projection plane corresponding to one pixel of the captured image will be described with reference to FIG. 17. The square surrounded by point A, point B, point C, and point D indicates the region on the projection plane corresponding to one pixel of the captured image. Trajectories C1, C2, and C3 are trajectories of light. The trajectory of the next circle of the trajectory C1 is C2, and the trajectory of the next circle of C2 is C3. In addition, the black circles indicate the timing at which the addition pulse generation circuit 2304 of the present embodiment transmits the pulse instructing the addition to the adder 2303. In FIG. 17, there are a total of nine black circles in the region corresponding to one pixel of the captured image. As illustrated in FIG. 17, in the light scanning using the optical scanning unit 10 of the present embodiment, a plurality of light trajectories may pass through the region on the projection plane corresponding to one pixel. For this reason, the timing at which the amount of light received by the light receiving unit 12 is acquired is a problem. Generally, S/N in the captured image can be improved by integrating the current output from the detector.

For example, in the circuit that takes the addition averaging to add $V_{conv}$ to the internal value, in the case of an operation of resetting the internal value at every timing at which the coordinates of the pixel output by the re-mapping control unit 21 is switched to (xcalc, ycalc), the internal value at the time of the trajectory C3 in the case of FIG. 17 is rest and $V_{conv}$ data can be acquired at a time. The timing at which the coordinates output by the re-mapping control unit 21 are switched to (xcalc, ycalc) may be replaced with the timing at which the coordinates from the adjacent pixel are shifted to the pixel of (xcalc, ycalc). Since the light scanning using the optical scanning unit 10 of the present embodiment has a spiral trajectory, there is a case where the time when the trajectory C3 finally passing through the pixel exists in the region of the pixel is short. Therefore, it is preferable to perform the addition corresponding to the address of as in the present embodiment, without using the switching of the pixel. For this reason, it is preferable to average the converted values $V_{conv}$ even through a plurality of trajectories. Furthermore, according to the present embodiment, the average value of $V_{conv}$ is finally obtained by acquiring and adding $V_{conv}$ at the timings of the entire nine black circles illustrated in FIG. 17. As a result, S/N ratio in the captured image can be improved.

Furthermore, the configuration of the present embodiment has the effect of becoming a spiral trajectory. The vertical axis of the brightness characteristic illustrated in FIG. 13 can be regarded as the total time when the laser spot exists at the radius thereof. For the sake of description, the total time for which the laser spot exists at a certain radius is referred to as a residence time. This means that the total time for which the laser spot exists in the region of one pixel at the inner periphery is long when the image is captured, and the inventors found that it was possible to improve S/N by adopting the configuration of the present embodiment. In other words, the number of black circles in FIG. 17, that is, the number of times of averaging, can be more allocated to the inner periphery. This will be described below in detail.

As represented by (Math. 7), the characteristic of FIG. 13 is the function that is inversely proportional to the radius. On the other hand, in the case of increasing the number of times of averaging as many as possible, the addition pulse generation circuit 2304 repeatedly transmits the pulse to the adder 2303 at the highest period that can be handled as hardware. That is, the upper limit of the number of times of averaging is proportional to the residence time, and this is inversely proportional to the radius. In the following description, it is assumed that the case of increasing the number of times of averaging as many as possible is considered, and the number of time of averaging is set to the upper limit.

The radius of the spiral trajectory drawn by the imaging device 2 of the present embodiment is set to 1, and the residence time at the radius is normalized to 1. For example, the residence time on the circle having a radius of 0.5 is double, and the residence time in the region having a radius of 0.5 or less is double or more. That is, according to the present embodiment, in the center of the circular captured image having a radius of 1 and the region having a radius of 0.5 or less, S/N can be improved twice or more than the outermost periphery. Since the region having a radius of 0.5 or more corresponds to the area of ¼ of the whole captured image, it has a size that cannot be ignored, and corresponds to the center of the field of view that people tend to pay attention to. Therefore, S/N in this region can be significantly improved. This effect is obtained since it adopts the configuration in which the converted values $V_{conv}$ at all the nine timings indicated by the black circles in FIG. 17 are averaged.

Next, a first modification example of the second embodiment will be described. FIG. 15, which is the block diagram illustrating the imaging device 2, and FIG. 16, which is the block diagram of the periphery of the image generation unit, are common to the second embodiment. In the first modification example, the operations of the internal circuits of the addition pulse generation unit 2304 and the count-up circuit 2305 are different, and the connection state illustrated in FIG. 16 is common to the second embodiment. In the first modification example, only a predetermined number of times of additions are performed in the period in which the coordinates output by the re-mapping control unit 21 are (xcalc, ycalc).

The addition pulse generation circuit 2304 in the present modification example has the same function as that of the second embodiment and also has the function of stopping the transmission of the pulse instructing the addition to the adder 2303 based on the instruction from the count-up circuit 2305. The count-up circuit 2305 in the present embodiment has the same function as that of the second embodiment and also outputs the instruction to stop the addition to the addition pulse generation unit 2304 when the count value is equal to or greater than a predetermined threshold value. Here, as an example, the predetermined threshold value is 8.

Due to the above configuration, the result of adding the eight converted values $V_{conv}$ is finally stored in the captured image storage memory 33. It is assumed that pulses instructing the addition to the adder 2303 are transmitted eight times or more in the region of one pixel even at the outermost periphery.

There are two effects in the present modification example. The first effect of the present modification example is that the saturation in the inner periphery can be prevented. In the brightness characteristics of FIG. 13, the brightness in the inner most periphery exceeds 100. This means that, when the capturing is performed with the configuration of the second embodiment, a value obtained by adding the converted value $V_{conv}$ 100 times or more is stored in the captured image storage memory 33. Since the captured image storage memory 33 is a digital circuit, the value may be saturated. Alternatively, if designed not to be saturated, there is a possibility that a quantization error will become a problem at the outer periphery. According to the present modification example, the number of times of additions is delimited to eight times, and the above-described saturation problem does not occur.

The second effect of the present modification example is that the division can be omitted. Since the captured image storage memory 33 is a digital circuit, the added value stored in the captured image storage memory 33 is stored as a digital value. Division by 8 in the digital values can be easily realized by performing 3-bit shift with the digital value as a binary number. The 3-bit shift may be performed by the external control device 50, or may be performed inside the imaging device 2. In either case, since the division can be omitted, it is possible to obtain an average value with less circuit capacity. As described above, it is preferable that the predetermined threshold value in the present modification example is a power of 2.

Next, a second modification example of the second embodiment will be described below. The first modification example of the second embodiment can serve as the configuration of the embodiment 2. In the present modification example focusing on this point, the outer periphery is the configuration of the second embodiment, and the inner periphery is the first modification example of the second embodiment.

As one example, the switching between the inner periphery and the outer periphery is that r1 is a value of ⅟10 of the radius r2 of the outermost periphery. Therefore, the effect of the second embodiment can be obtained in the region having a radius of r1 or more. At the radius of r1, it is possible to improve 10 times S/N with respect to the outermost periphery. At the radius of r1 or less, the number of times of additions of the converted value $V_{conv}$ is limited to a predetermined threshold value. Here, the threshold value is the same value as the number of times of additions at the radius r1 in the configuration of the second embodiment. In the case of the present modification example, the division for obtaining the average value of $V_{conv}$ is required as in the case of second embodiment.

The first effect of the present modification example is that both of the effect of the second embodiment such as the improvement of S/N ratio by the integration and the effect of the first modification example of the second embodiment such as the avoidance of the saturation can be realized. In the present embodiment, as one example, the switching between the inner periphery and the outer periphery is that r1 is a value of ⅟10 of the radius r2 of the outermost periphery. As a result, the improvement of S/N ratio at the radius of 1 or less is uniformly 10 times that on the outermost periphery. For example, it is assumed that there is sufficient S/N improvement as much as 10 times as compared with the outermost periphery. In addition, if about 10 times, the problem such as saturation and quantization is easily resolved. That is, both effects can be exhibited by switching the second embodiment and the first modification example of the second embodiment according to the radius.

In addition, the second effect is that discontinuity of the captured image at the switching between the inner periphery and the outer periphery can be avoided. In the present embodiment, the predetermined value was set to be the same as the number of times of additions at the radius r1 in the configuration of the second embodiment. Attention is paid to the number of times of additions of $V_{conv}$. If based on the number of times on the outermost periphery, the number of times of additions increases toward the inner periphery and it becomes 10 times at the radius r1. It is uniformly 10 times in the region having the radius r1 or less. Therefore, according to the configuration of the present modification example, the number of times of additions is continuous at the switching point of the operation of the circuit at the radius r1. As a result, it is possible to avoid the discontinuity of the captured image at the switching point between the inner periphery and the outer periphery.

Next, a third modification example of the second embodiment will be described. In the present modification example, averaging is performed between frames. The present modification example is common to the configuration of the second embodiment. The addition pulse generation circuit 2304 of the present embodiment counts the number of times the address information output by the address conversion circuit 2301 has coincided with a predetermined address, and outputs a reset signal for returning the count value to 0 when the count value reaches a predetermined number of times. According to this configuration, for example, when the predetermined number of times is five times, a result of adding the converted value $V_{conv}$, converted in the period in which the coordinates output by the re-mapping control unit 21 are (xcalc, ycalc), over the period of five frames is stored in the captured image storage memory 33. Furthermore, the number of times of additions performed over the period of the five frames is stored in the number-of-times-of-addition storage memory 34. As a result, the average value of the converted values $V_{conv}$ converted over the period of the five frames can be obtained.

As described above, the circuit configuration for finally obtaining the average value of the converted values $V_{conv}$ converted in the period in which the coordinates output by the re-mapping control unit 21 are (xcalc, ycalc) may be variously considered. The present embodiment is a realizing method of storing the added value, during the same frame, in the period in which the coordinates are the corresponding pixel. The first modification example is a realizing method of storing values added eight times, during the same frame, in the period in which the coordinates are the corresponding pixel. The second modification example is a realizing method of switching the upper limit of the number of times of additions according to the radius. Furthermore, as described above, a division circuit may be provided inside the imaging device 2 to store an average value. As described above, the stored value may be an added value or an averaged value, or a value obtained by switching them under a predetermined condition. Therefore, the value to be stored can be abstracted as a "value subjected to predetermined processing."

In addition, the third modification example is a realizing method of storing the added value, during a plurality of frames, in the period in which the coordinates are the corresponding pixel. Similarly, in this case, since various other forms can be considered, the value to be stored can be abstracted as a "value subjected to predetermined processing." The terms "over a plurality of frames" can be paraphrased as "over the period of drawing a spiral trajectory a predetermined number of times." As described above, according to the present embodiment, the imaging device having the function of capturing an image can properly capture an image.

Third Embodiment

The second embodiment has the configuration of the case of having the function of capturing an image. The present embodiment is a configuration that measures a distance to an object by using time of flight (TOF) method, and acquires a distance image.

Figure 18:
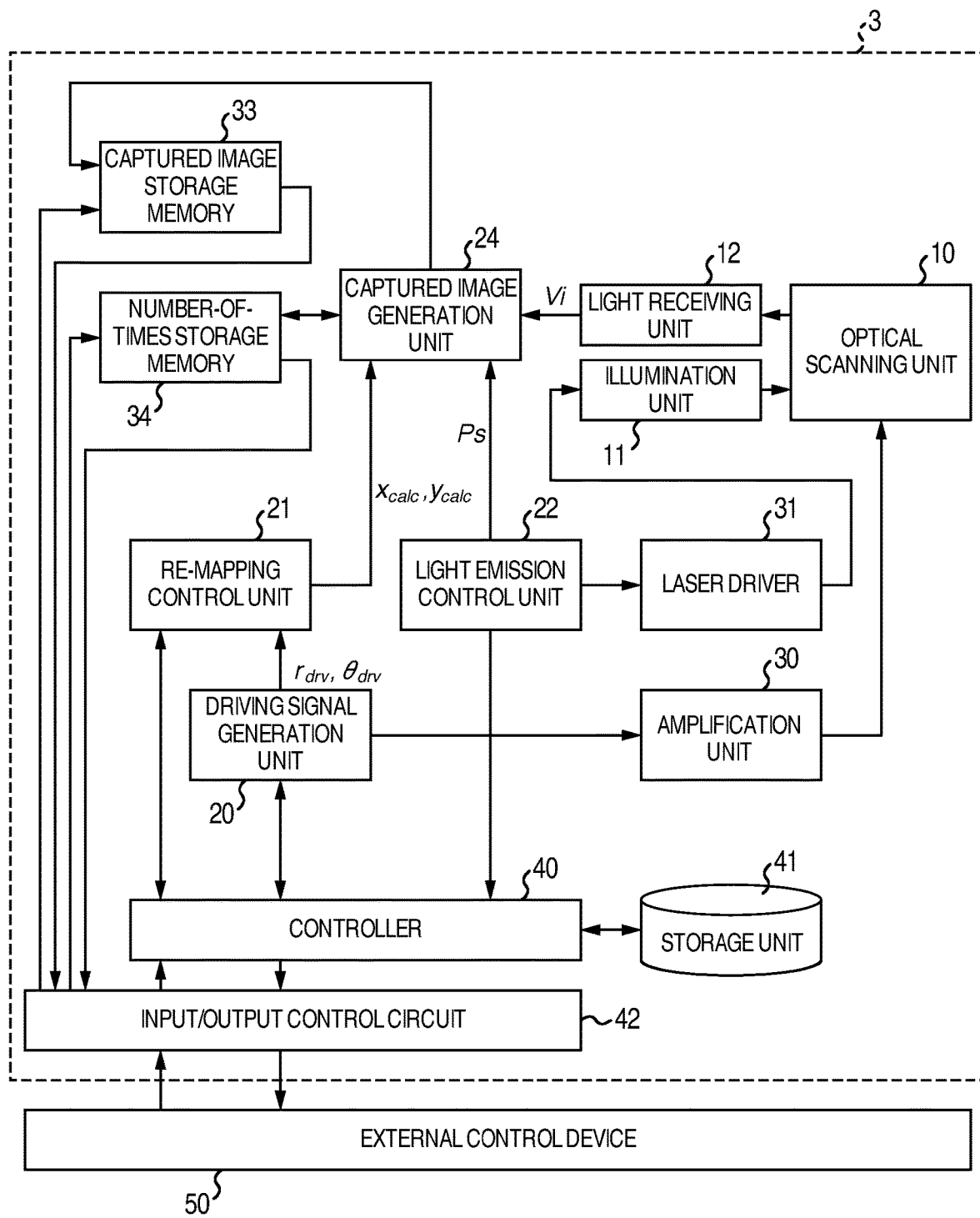
FIG. 18 is a block diagram illustrating a configuration of an imaging device 3 of a third embodiment.

FIG. 18 is a block diagram illustrating a distance measurement device 3 including an optical scanning unit 10. In the block diagram of the second embodiment, the same reference numerals are assigned to the same elements as those in FIG. 1, and a description thereof will be omitted. The present embodiment differs from the configuration of the second embodiment in terms of the captured image generation unit 24 and in that a signal Ps indicating a timing at which a light emission control unit 22 emits light is input to the captured image generation unit 24.

The captured image generation unit 34, the captured image storage memory 33, and the number-of-times-of-addition storage memory 24 in the present embodiment calculate a distance to the object from the time until light scanned by light scanning in the optical scanning unit 10 strikes the object and returns back, generates a distance image, and provides the capturing function. Information on the finally captured distance image is stored in the captured image storage memory 33. Since the vertical and horizontal size of the finally acquired image is a predetermined value, the information is stored at an address of the captured image storage memory 33 associated with the coordinates on the image.

The captured image generation unit 24 in the present embodiment has a function of measuring a distance and a function of integrating the measured distance. The captured image generation unit 24 receives, from the light receiving unit 12, information Vi associated with light returned from the object and generates distance information. In addition, the captured image generation unit 24 receives the coordinates (xcalc, ycalc) output by the re-mapping control unit 21. The captured image generation unit 24 adds the distance information at each predetermined timing and stores the added result in the captured image storage memory 33. In addition, the number of times of additions is stored in the number-of-times-of-addition storage memory 34.

Figure 19:
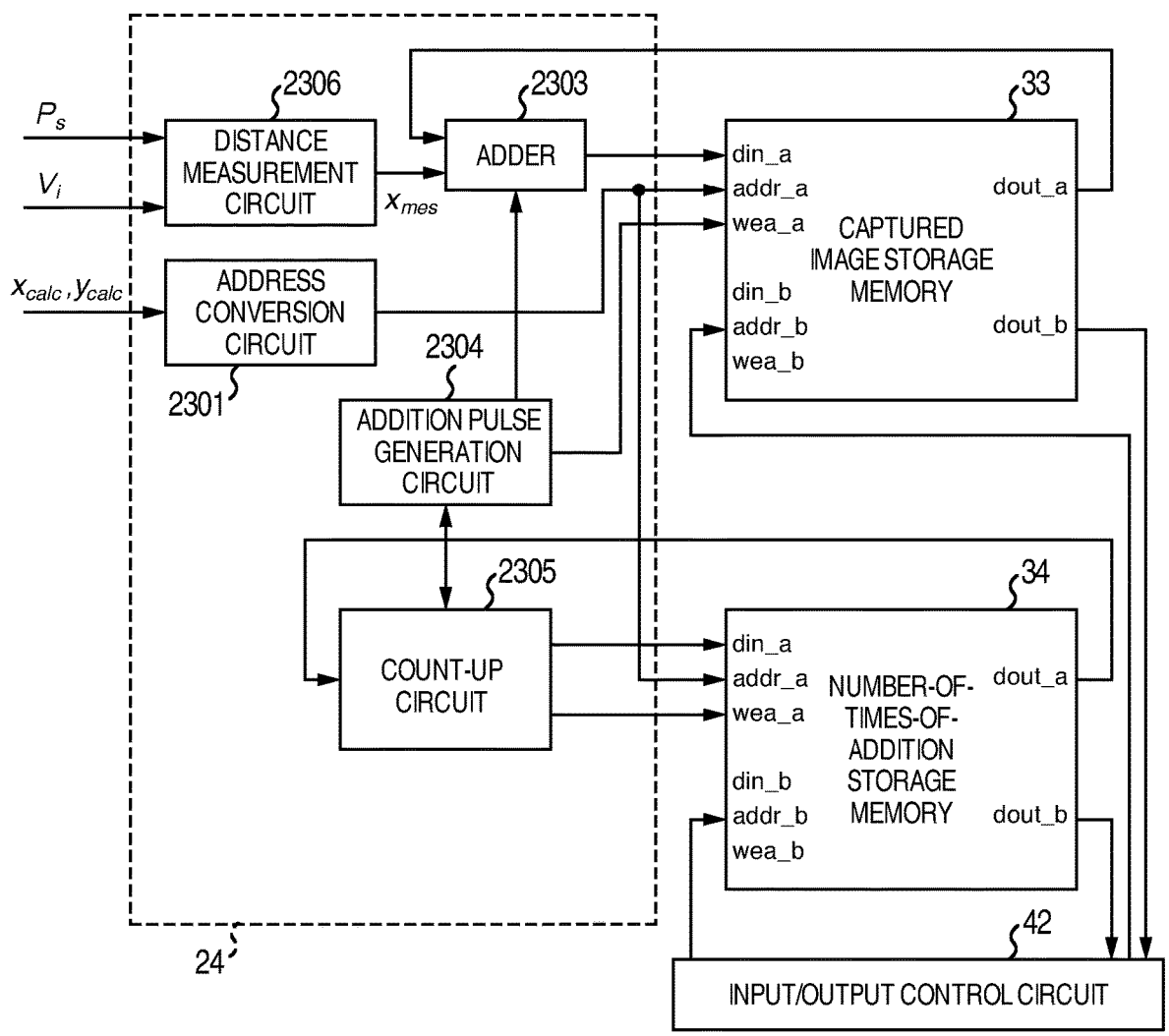
FIG. 19 is a diagram for describing a relationship between a configuration of a captured image generation unit 24 and related blocks in the third embodiment.

The relationship between the configuration of the captured image generation unit 24 of the present embodiment and related blocks will be described with reference to FIG. 19. The same reference numerals are assigned to the elements common to those in FIG. 16 that is the block diagram corresponding to the second embodiment, and a description thereof will be omitted. The second embodiment differs from the configuration of FIG. 16 in that the conversion circuit 2302 is replaced with the distance measurement circuit 2307, and the signal Ps indicating the timing at which the light emission control unit 22 emits light is input to the distance measurement circuit 2307.

The distance measurement circuit 2307 inputs the signal Ps and the signal Vi from the light receiving unit 12, and measures a distance from the time until the light returned back to the light receiving unit 12 is detected after the light emission control unit 22 instructs the light emission. The distance $X_{mes}$ measured by the distance measurement circuit 2307 is added to data read from the data output terminal dout_a of the port A of the captured image storage memory 33 by the adder 2303.

That is, in the second embodiment, the result of integrating the value $V_{conv}$ obtained by converting the input value Vi into a digital value is stored in the captured image storage memory 33, but in the present embodiment, the distance value $X_{mes}$ measured by using the input value Vi is stored in the captured image storage memory 33. In the present embodiment, the input value Vi may be a value obtained by performing current-to-voltage conversion on the current output from the detector in the light receiving unit 12. A comparator compares the value obtained by performing the current-to-voltage conversion on the current output from the detector in the light receiving unit 12 with a predetermined voltage, and the comparison result (logic value) may be used as the input value Vi.

Next, the effects of the present embodiment will be described. The first effect of the present embodiment is that the distortion of the distance image can be satisfactorily corrected. This is the same in both the present embodiment and the second embodiment in terms of imaging, and it is apparent since whether the physical amount to be imaged is the intensity of the return light or whether it is the distance measured from the return light is only different.

The second effect of the present embodiment is that it is possible to improve the measurement accuracy in the distance image. The effect of storing in the captured image storage memory 33 is to improve the measurement accuracy in the case of the present embodiment in which the distance measured from the return light is stored, whereas S/N is improved in the case of the second embodiment in which the intensity of the return light is stored. Therefore, for example, the expression "double improvement of S/N" in the description of the second embodiment can be read as "double improvement of measurement accuracy" in the present embodiment. As described above, according to the present embodiment, it is possible to appropriately obtain a distance image in the distance measurement device having the function of measuring the distance.

Fourth Embodiment

In the above embodiments, the distortion of the finally displayed or captured image is corrected by the re-mapping control unit 21, but the trajectory of the laser spot is not corrected. In the present embodiment, the position of the light emitted by the optical scanning unit 10 is detected, and the driving signal generation signal performs correction based on the result of detection. The present embodiment is applicable to not only the imaging device having the function of displaying an image but also the imaging device of the second embodiment having the function of capturing the image, and the distance measurement device of the third embodiment having the function of measuring the distance. Here, the image device having the function of display the image will be described by way of example.

Figure 20:
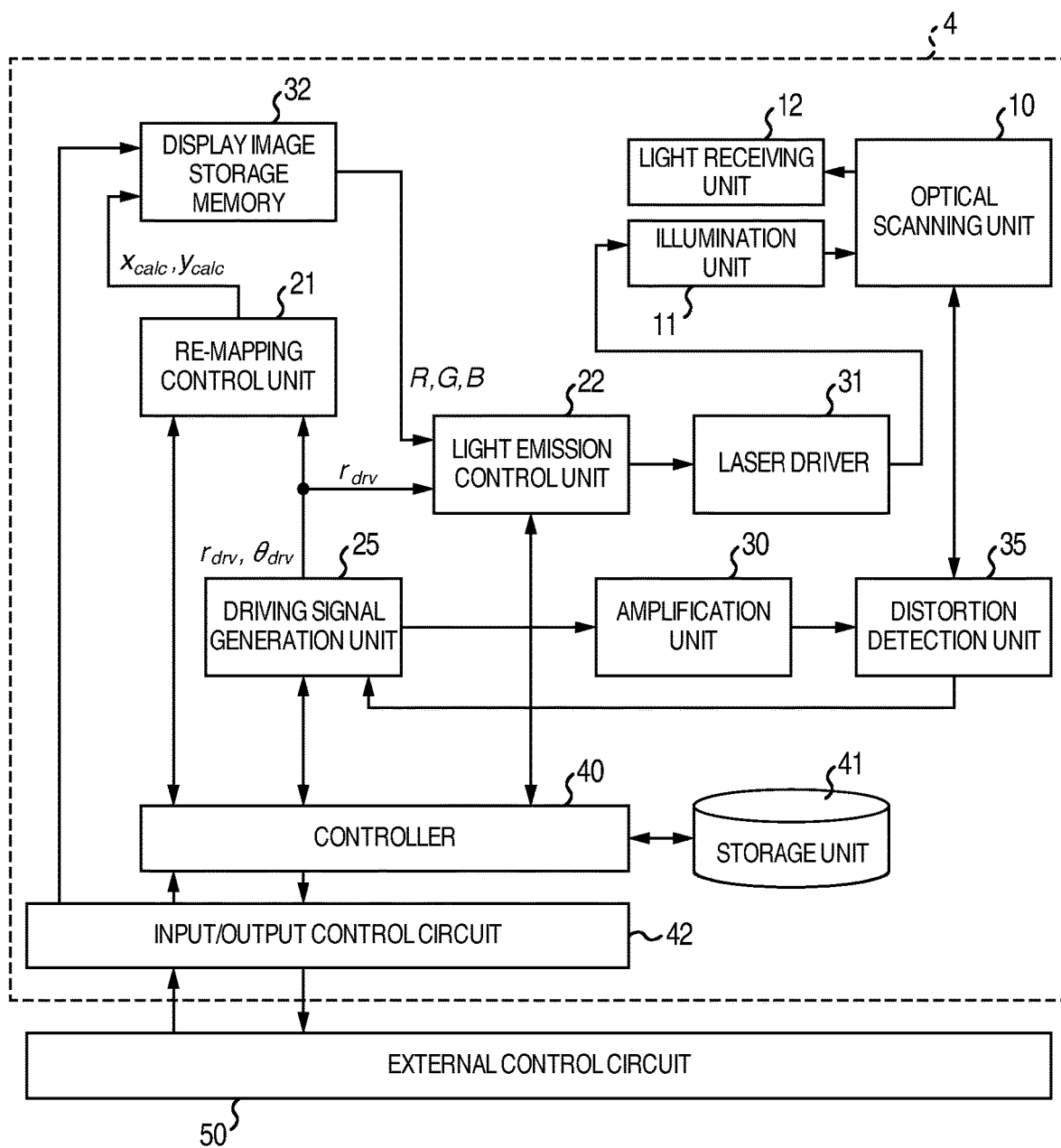
FIG. 20 is a block diagram illustrating a configuration of an imaging device 4 of a fourth embodiment.

FIG. 20 is a block diagram illustrating an imaging device 4 including an optical scanning unit 10. The same reference numerals are assigned to the elements common to those in FIG. 1 that is the block diagram of the first embodiment, and a description thereof will be omitted. The difference from the first embodiment in terms of the configuration is the internal configurations of the distortion detection unit 35 and a driving signal generation unit 25 and is a partial connection state between blocks.

The distortion detection unit 35 constitutes an electric circuit receiving a signal from the amplification unit 30 as an input, and outputs voltages Vdx1, Vdx2, Vdy1, and Vdy2 to be supplied to electrodes provided in the vibration unit 101. In addition, the distortion detection unit 35 detects the distortion of the vibration unit 101 by using a signal of the electric circuit, and outputs the detection result to the driving signal generation unit 25. In addition, the driving signal generation unit 25 generates (a plurality of) driving signals for scanning the light in the optical scanning unit 10, based on an instruction from the controller. Furthermore, the driving signal generation unit 25 controls the driving signals by using the distortion detected by the distortion detection unit 35.

The distortion detection unit 35 of the present embodiment and the electrodes of the corresponding vibration unit 101 will be described with reference to FIG. 21. As described with reference to FIG. 3, it can be considered that the piezoelectric element 1010 functioning as an actuator may be divided into four regions. Therefore, in FIG. 21, for the sake of description, a region interposed between an electrode 1013 and an electrode 1015 will be described by way of example.

The distortion detection unit 35 includes a capacitor 3501, a capacitor 3502, a capacitor 3503, a filter 3504, a filter 3505, and a difference circuit 3506. Here, the electric circuit 351 is a bridge circuit configured to detect distortion. The electric circuit 351 receives a voltage Vy1 as an input, and outputs a voltage Vd1 applied to the electrode 1013 of the outer periphery of the vibration unit 101 and a voltage VO applied to the electrode 1015 of the inner periphery of the vibration unit 101. In addition, the electric circuit 351 outputs voltages V1 and V2 for calculating distortion.

Figure 21:
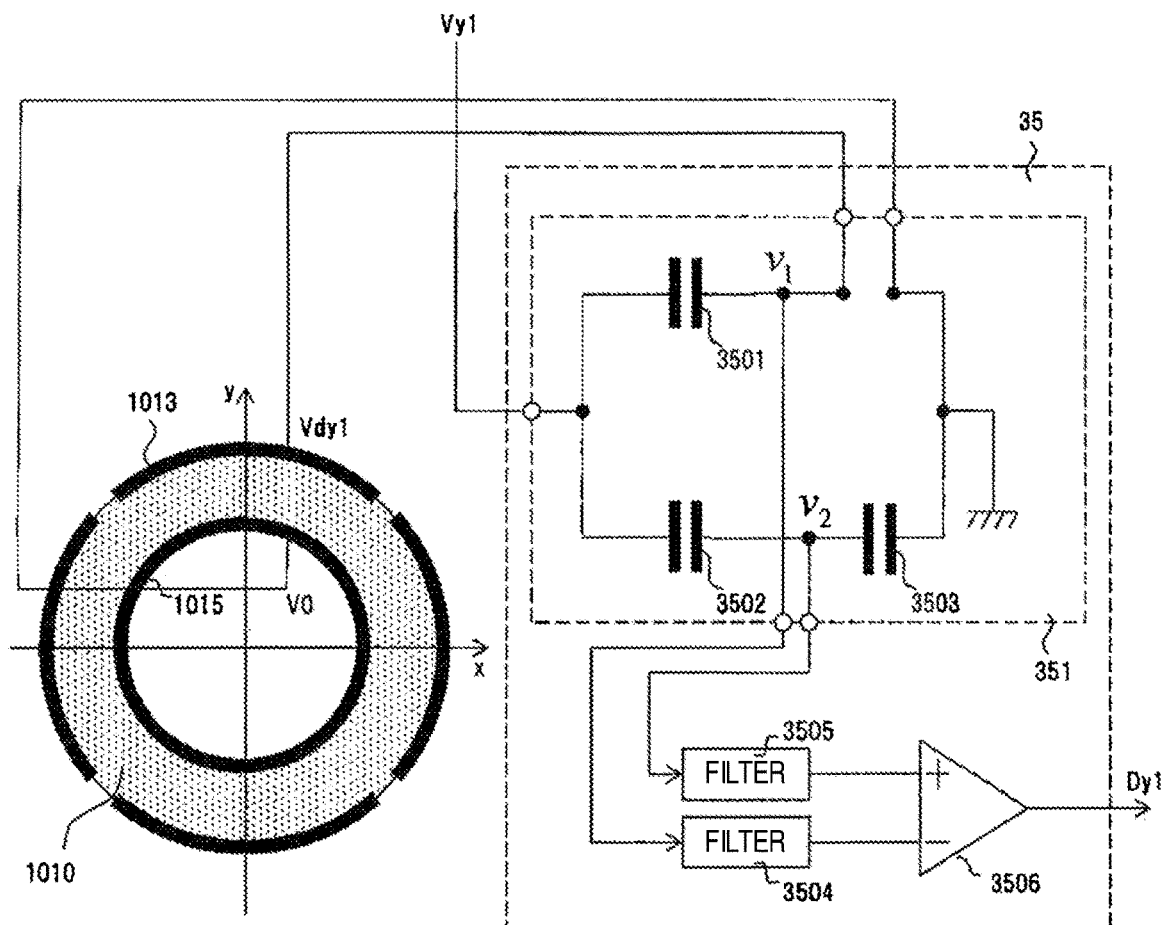
FIG. 21 is a diagram for describing a distortion detection unit 35 of the fourth embodiment and electrodes of a corresponding vibration unit 101.

As illustrated in FIG. 21, in the electric circuit 351, the voltage Vy1 is applied to one end of the capacitor 3501. In addition, the other end of the capacitor 3501 is connected to the electrode 1013 of the outer periphery of the vibration unit 101. In addition, the electrode 1015 of the inner periphery of the vibration unit 101 is grounded. In this circuit, it can be seen that the piezoelectric element 1010 interposed between the electrode 1013 and the electrode 1015 is connected in series to the capacitor 3501. In addition, it can be seen that the voltage Vy1 is applied to the circuit in which the piezoelectric element 1010 interposed between the electrode 1013 and the electrode 1015 is connected in series to the capacitor 3501. Similarly, the voltage Vy1 is applied to one end of the capacitor 3502. In addition, the other end of the capacitor 3502 is grounded through the capacitor 3503.

The electric circuit 351 outputs, as $v_1$, a voltage of an electric wire connecting the capacitor 3501 and the piezoelectric element 1010. In other words, the voltage Vyd1 applied to the electrode 1013 is output as v1. In addition, a voltage of an electric wire connecting the capacitor 3502 and the capacitor 3503 is output as $v_2$. The filter 3504 is a filter having predetermined frequency characteristics. In addition, the filter 3505 is a filter having the same frequency characteristics as the filter 3504. The filter 3504 receives the voltage v1 as an input, and outputs a passed signal to the difference circuit 3506. The filter 3505 receives the voltage $v_2$ as an input, and outputs a passed signal to the difference circuit 3506.

The difference circuit 3506 outputs, as Dy1, a voltage corresponding to $v_2$-$v_1$, which is a difference between the voltage $v_1$ and the voltage $v_2$ output from the electric circuit 351, by using the signals output from the filter 3504 and the filter 3505. As will be described below, the voltage Dy1 corresponds to the distortion detected in the region of the piezoelectric element 1010 interposed between the electrode 1013 and the electrode 1015. The distortion detection signal Dy1 is output to the driving signal generation unit 25. In the above description, the region interposed between the electrode 1013 and the electrode 1015 has been described by way of example, but the same applies to the other three electrodes. That is, by configuring the same circuit with respect to four electrodes, a distortion detection signal Dx1 is output from a circuit configured with respect to the electrode 1011, a distortion detection signal Dx2 is output from a circuit configured with respect to the electrode 1012, and a distortion detection signal Dy2 is output from a circuit configured with respect to the electrode 1014. The circuits configured with respect to these three electrodes are not illustrated in FIG. 21.

Figure 22:
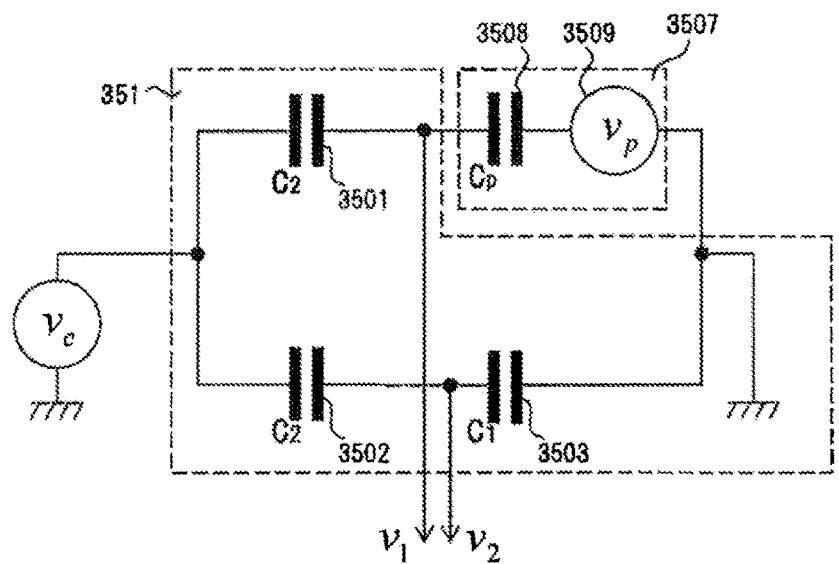
FIG. 22 is a diagram illustrating an equivalent circuit in the fourth embodiment.

The operation of the electric circuit 351 in the present embodiment will be described with reference to the equivalent circuit illustrated in FIG. 22. FIG. 22 illustrates the bridge circuit including the electric circuit 351 and a region of the piezoelectric element 1010 interposed between one of the four electrodes of the outer periphery and the inner peripheral electrode 1015 (hereinafter, referred to as a partial region of the piezoelectric element 1010). A voltage Vc is a voltage applied to the bridge circuit and corresponds to Vy1 in FIG. 21. In addition, the piezoelectric element 1010 interposed between one of the four electrodes of the outer periphery and the inner peripheral electrode 1015 is represented by an equivalent circuit 3507. A equivalent capacitor 3508 is a capacitor having a capacitance $C_p$ equivalent to the partial region of the piezoelectric element 1010, and a voltage source 3509 equivalently indicates a voltage generated by distortion of the partial region of the piezoelectric element 1010.

Here, the capacitances of the capacitor 3501 and the capacitor 3502 are commonly C2, and the capacitance of the capacitor 3503 is $C_1$. In the electric circuit 351, the voltages $v_1$ and $v_2$ are calculated by the following equations.

[Math. 11]
$$v_1 = \frac{C_2}{C_p + C_2}(v_c - v_p) \quad \text{(Math. 11)}$$

[Math. 12]
$$v_2 = \frac{C_2}{C_1 + C_2} v_c \quad \text{(Math. 12)}$$

Here, when the capacitance $C_1$ of the capacitor 3503 is adjusted to be equal to the capacitance $C_p$ of the partial region of the piezoelectric element 1010, the value vp of the voltage source 3509 can be taken out by the following calculation.

[Math. 13]
$$v_s = v_2 - v_1 = \frac{C_2}{C_p + C_2} v_p \quad \text{(Math. 13)}$$

Since the value vp of the voltage source 3509 is a voltage generated by a piezoelectric effect as a result of the distortion of the partial region of the piezoelectric element 1010, the value vp of the voltage source 3509 is proportional to the distortion of the partial region of the piezoelectric element 1010. That is, the distortion detection signal Dy1 output from the difference circuit 3506 of the present embodiment is a signal indicating the distortion of the partial region of the piezoelectric element 1010. Furthermore, as frequency characteristics of the filter 3504 and the filter 3505, DC drift can be removed by using a band-pass filter or a high-pass filter. Herein, since the vibration unit 101 of the present embodiment is driven at a resonant frequency of a cantilever including a light guide path 102, the circuit constant is designed so that the resonant frequency of the cantilever is included in the passband.

In the present embodiment, the filter 3504 and the filter 3505 are provided in front of the difference circuit 3506, but it is apparent that the filters may be provided after the difference circuit 3506. However, by providing the filters in front of the difference circuit 3506 as in the present embodiment, the signal from which DC components are removed can be input to the difference circuit 3506. Thus, it is advantageous in that saturation caused by DC drift can be prevented.

Figure 23:
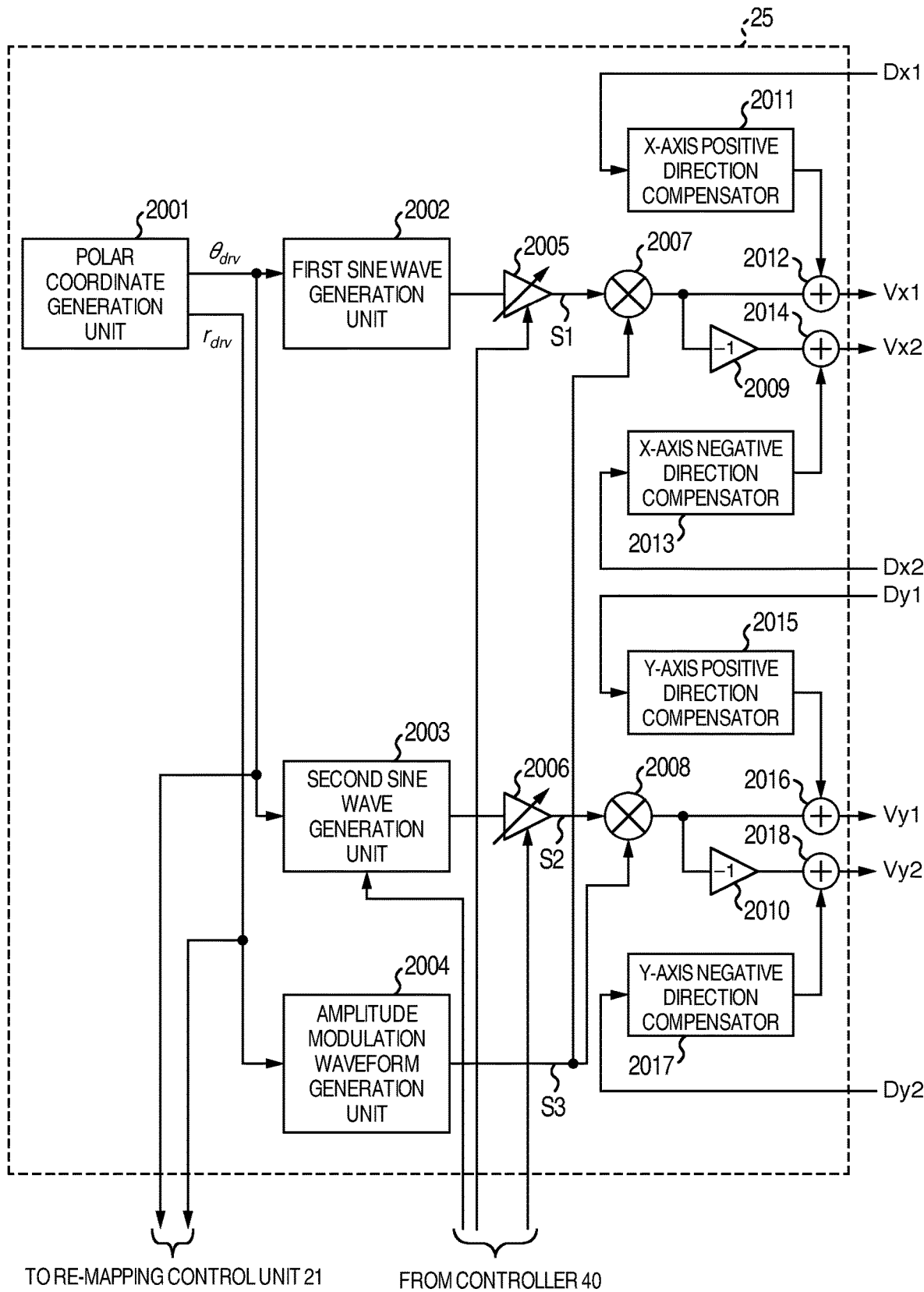
FIG. 23 is a block diagram illustrating a configuration of a driving signal generation unit 25 of the fourth embodiment.

Subsequently, the configuration of the driving signal generation unit 25 in the present embodiment will be described with reference to FIG. 23. FIG. 23 illustrates the configuration of the driving signal generation unit 25 in the present embodiment. The same reference numerals are assigned to the elements common to those in FIG. 6 that is the configuration diagram of the driving signal generation unit 20 in the first embodiment, and a description thereof will be omitted. The present embodiment differs from the configuration of FIG. 6, which is the configuration diagram of the driving signal generation unit 20 in the first embodiment, in terms of the circuit configuration subsequent to the first multiplier 2007, and the circuit configuration subsequent to the second multiplier 2008.

The distortion detection signals Dx1, Dx2, Dy1, and Dy2 detected by the bridge circuit described above are input to the driving signal generation unit 25 of the present embodiment. An X-axis positive direction compensator 2011 internally stores an ideal waveform of the distortion detection signal Dx1. The X-axis positive direction compensator 2011 outputs, to the adder 2012, a signal obtained by compensating gain and phase with respect to a difference between the distortion detection signal Dx1 and the ideal waveform. The adder 2012 adds the output signal of the first multiplier 2007 and the output signal of the X-axis positive direction compensator 2011 and outputs the voltage Vx1.

An X-axis negative direction compensator 2013 internally stores an ideal waveform of the distortion detection signal Dx2. The X-axis negative direction compensator 2013 outputs, to the adder 2014, a signal obtained by compensating gain and phase with respect to a difference between the distortion detection signal Dx2 and the ideal waveform. The adder 2014 adds the output signal of the first inverse gain 2009 and the output signal of the X-axis negative direction compensator 2013 and outputs the voltage Vx2.

A Y-axis positive direction compensator 2015 internally stores an ideal waveform of the distortion detection signal Dy1. The Y-axis positive direction compensator 2015 outputs, to the adder 2016, a signal obtained by compensating gain and phase with respect to a difference between the distortion detection signal Dy1 and the ideal waveform. The adder 2016 adds the output signal of the second multiplier 2008 and the output signal of the Y-axis positive direction compensator 2015 and outputs the voltage Vy1. A Y-axis negative direction compensator 2017 internally stores an ideal waveform of the distortion detection signal Dy2. The Y-axis negative direction compensator 2017 outputs, to the adder 2018, a signal obtained by compensating gain and phase with respect to a difference between the distortion detection signal Dy2 and the ideal waveform. The adder 2018 adds the output signal of the second inverse gain 2010 and the output signal of the Y-axis negative direction compensator 2017 and outputs the voltage Vy2.

Next, the effects of the present embodiment will be described. The first effect of the present embodiment is that the light scanning accuracy can be improved by detecting and controlling the position of light. Generally, only the voltage vp caused by the piezoelectric effect can be extracted in a state in which the voltage is applied to the piezoelectric element 1010. Furthermore, the piezoelectric element 1010 of the present embodiment has four partial regions and the electrode 1015 of the inner periphery is common. Even with such a configuration, according to the configuration of the present embodiment, only the voltage vp caused by the piezoelectric effect can be extracted.

Since the electrode 1015 of the inner periphery is common, the equivalent circuit 3507 of the partial region of the piezoelectric element 1010 in the bridge circuit of FIG. 22 cannot be disposed on the side where the voltage vc is applied (left side in FIG. 22). Even in this case, only the voltage vp caused by the piezoelectric effect can be extracted by Math. 13.

In addition, according to the configuration of the present embodiment, the signal obtained by compensating the gain and the phase based on the detected distortion detection signal is added to the driving signal. As a result, a feedback control system based on the distortion detection signal is configured. Therefore, the light scanning accuracy can be improved. Furthermore, in the present embodiment, the signal from which DC component is removed by the filter 3504 and the filter 3505 is generated, thereby improving the light scanning accuracy.

In addition, the second effect of the present embodiment is that accurate position of light can be detected. The inventors of the present invention found that, as a result of the vibration of the light guide path 102, the vibration propagated to the vibration unit 101 through the adhesive part 103 that is a fixed end. From this fact, in order to accurately detect the position of the light, it is preferable that the sensor for detecting distortion is disposed as close to the adhesion part 103 as possible. However, it is difficult to dispose additional sensors on the side close to the adhesive part 103 from the viewpoint of taking out the wire. On the other hand, according to the configuration of the present embodiment, the piezoelectric element 1010 functioning as an actuator is also used as a sensor for detecting distortion. Therefore, it is possible to detect distortion occurring in the piezoelectric element 1010 close to the adhesion part 103, and the position of the light can be accurately detected. In addition, a detection wire can be shared with a driving wire.

The third effect of the present embodiment is that the detection of the position of light and the size reduction can be realized. Since it is possible to detect the position of light without providing an additional sensor, it is compatible with the size reduction.

Furthermore, the fourth effect of the present embodiment is that the distortion of the image caused by the influence of distortion detection error can be satisfactorily corrected. That is, even in the case of the present embodiment, the coordinates is corrected by the re-mapping control unit 21 similar to the case of the first embodiment. Due to this, the residual error is also corrected by the correction of the coordinates by the re-mapping control unit 21 even by the feedback control based on the distortion detection signal. Therefore, the distortion of the image can be corrected successfully.

According to the novel configuration described in the present embodiment, the position of the light emitted from the optical scanning unit 10 can be detected by the distortion detection unit 35, and the correction can be performed based on the result. As described above as the fourth effect, the re-mapping control unit 21 may correct the coordinates, but the remapping control unit 21 may not correct the coordinates. Even in this case, the first to third effects can be obtained.

In the present embodiment, the distortion detection signal is input to the compensator provided in the driving signal generation unit 25, and the feedback control system is configured. However, the distortion detection signal may be input to the re-mapping control unit 21 and may be used for the calculation of the coordinate calculation unit 2102. Since the position where light is actually scanned can be detected by the distortion detection signal, more accurate coordinates (xcalc, ycalc) can be output. Therefore, in addition to the effect of the first embodiment, it is possible to further improve the light scanning accuracy.

Next, a first modification example of the fourth embodiment will be described. In the fourth embodiment, the electric circuit 351 for detecting distortion is a bridge circuit, but the circuit for detecting distortion is not limited thereto. The present modification example is an embodiment in which one side of the bridge circuit is removed.

Figure 24:
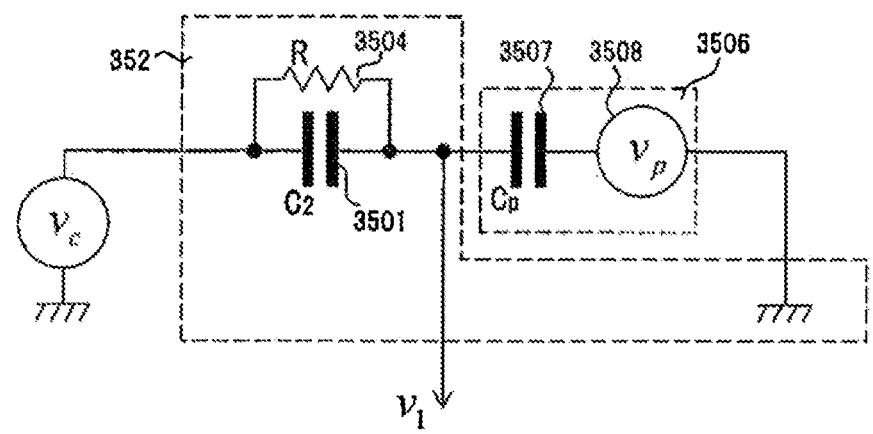
FIG. 24 is a diagram illustrating an equivalent circuit in a first modification example of the fourth embodiment.

FIG. 24 illustrates an equivalent circuit of the electric circuit 352 in the present embodiment. The same reference numerals are assigned to the elements common to those in FIG. 22 that is the configuration diagram of the electric circuit 351 in the fourth embodiment, and a description thereof will be omitted. The electric circuit 352 is substituted for the electric circuit 351 of the fourth embodiment. As can be seen from FIG. 24, the capacitor 3502 and the capacitor 3503 disappear and the output of the voltage $v_2$ also disappears, as compared with FIG. 22.

In the present modification example, the value of $v_2$ represented by (Math. 12) in the fourth embodiment is generated by, for example, the controller 40, and is output to the difference circuit 3506. As is apparent from (Math. 12), the value of $v_2$ can be calculated by multiplying the voltage vc by a predetermined magnification. As such, even in the circuit of FIG. 24 not including the bridge circuit, the value $v_p$ of the voltage source 3509 is extracted as in the case of the fourth embodiment, and the same effect as that of the fourth embodiment can be obtained.

A second modification example of the fourth embodiment will be described. Like the first modification example, the second modification example is another embodiment relating to a circuit for detecting distortion.

Figure 25:
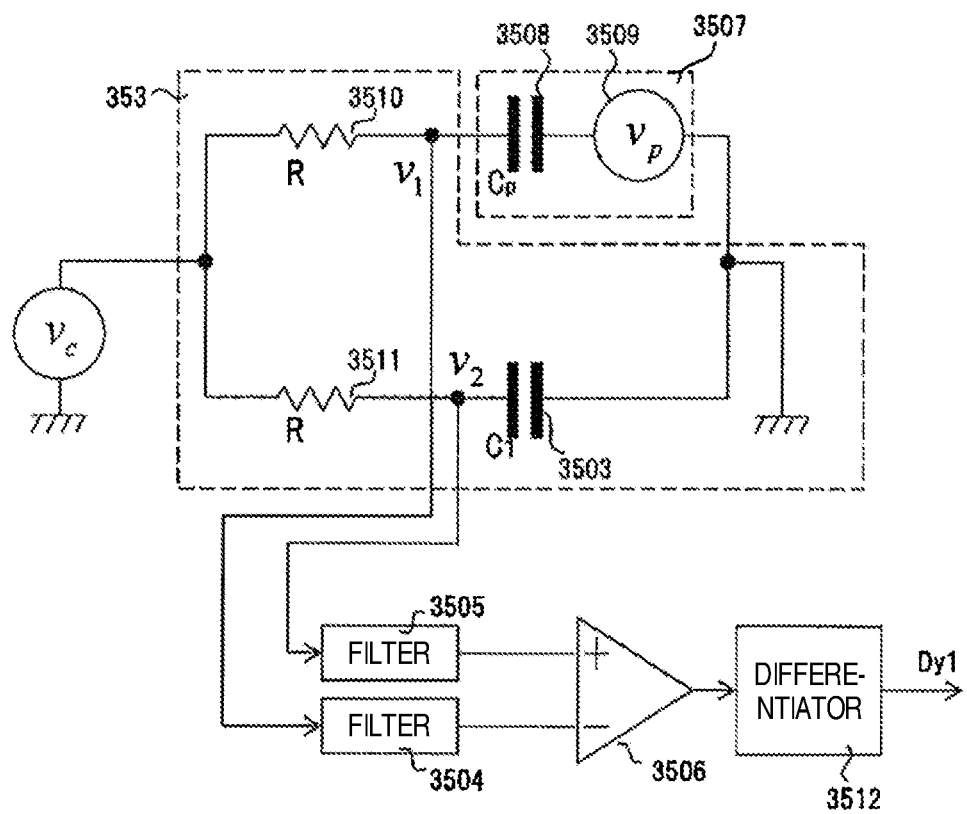
FIG. 25 is a diagram illustrating an equivalent circuit in a second modification example of the fourth embodiment.

FIG. 25 illustrates an equivalent circuit of the electric circuit 353 in the present modification embodiment. The same reference numerals are assigned to the elements common to those in FIG. 22 that is the configuration diagram of the electric circuit 351 in the fourth embodiment, and a description thereof will be omitted. The electric circuit 352 is substituted for the electric circuit 351 of the fourth embodiment. The difference from FIG. 22 that is the configuration diagram of the electric circuit 351 in the fourth embodiment is that the capacitor 3501 is replaced by a resistor 3510, and the capacitor 3502 is replaced by a resistor 3511. The electric circuit 353 is substituted for the electric circuit 351 in the fourth embodiment.

A resistance of the resistor 3510 and a resistance of the resistor 3511 are common to R. The voltages $v_1$ and $v_2$ in the electric circuit 353 are calculated by the following equations.

[Math. 14]

$$v_1 = \frac{1}{1 + C_p R s}(v_c - v_p) \qquad \text{(Math. 14)}$$

[Math. 15]

$$v_2 = \frac{1}{1 + C_1 R s} v_c \qquad \text{(Math. 15)}$$

Here, when the capacitance $C_1$ of the capacitor 3503 is adjusted so as to be equal to the capacitance $C_p$ of the partial region of the piezoelectric element 1010, the value vp of the voltage source 3509 can be extracted by the following calculation.

[Math. 16]

$$v_2 - v_1 = \frac{1}{1 + C_p R s} v_p \qquad \text{(Math. 16)}$$

Figure 26A:
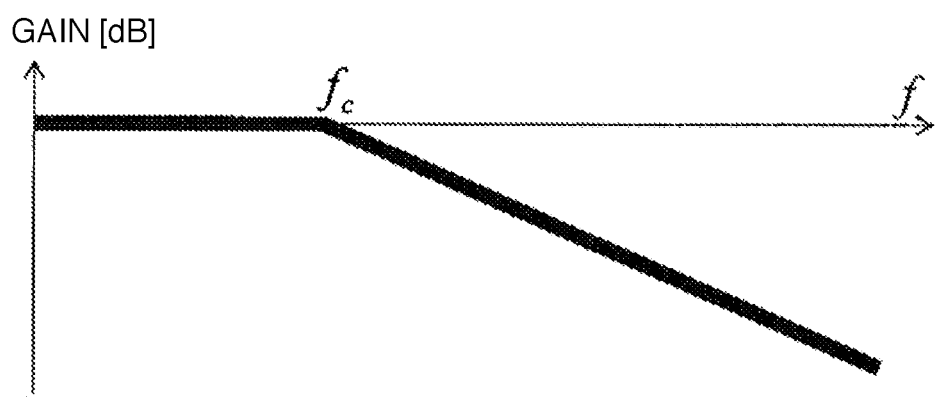
FIG. 26A is gain characteristics for describing a voltage $v_p$ in the second modification example of the fourth embodiment.

When (Math. 16) is regarded as a transfer function from vp to $(v_2-v_1)$, the transfer function is the form of a general first-order low-pass filter, and the characteristics of the gain are schematically shown in FIG. 26A. The frequency fc represents the cutoff frequency of the first-order low-pass filter, and the value thereof is represented by the following equation.

[Math. 17]

$$f_c = \frac{1}{2\pi C_p R} \qquad \text{(Math. 17)}$$

Here, as in the fourth embodiment, the circuit constant may be designed so that the resonant frequency of the cantilever including the light guide path 102 is included in the pass-band of the low-pass filter. Here, another aspect will be described. In the present embodiment, the resonant frequency of the cantilever is designed to be included in the stop-band of the low-pass filter. Furthermore, as illustrated in FIG. 25, a differentiator 3512 is provided, the output signal of the difference circuit 3506 is input to the differentiator, and the differentiated signal is output as a voltage Dy1.

Figure 26B:
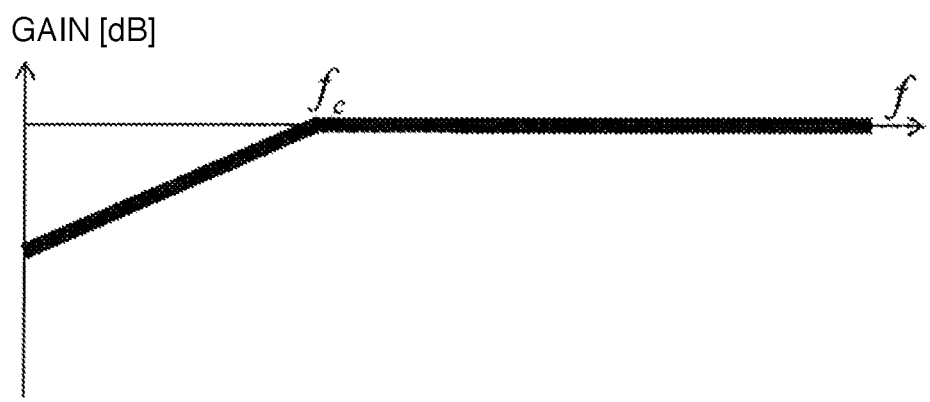
FIG. 26B is gain characteristics for describing a voltage Dy1 in the second modification example of the fourth embodiment.

The signal obtained by this circuit configuration can be represented by the following equation, and gain characteristics thereof are provided as illustrated in FIG. 26B.

[Math. 18]

$$s(v_2 - v_1) = \frac{s}{1 + C_p R s} v_p \qquad \text{(Math. 18)}$$

As described above, in a band where the frequency is equal to or higher than fc, the gain of the transfer function from vp to the voltage Dy1 is constant. That is, the voltage Dy1 becomes a signal proportional to vp, and is a signal indicating distortion of the partial region of the piezoelectric element 1010. This is also apparent from the fact that, when considering a sufficiently large band in (Math. 18), it can be approximated as the following equation.

[Math. 19]

$$s(v_2 - v_1) \approx \frac{1}{C_p R} v_p \qquad \text{(Math. 19)}$$

In addition, as is apparent from FIG. 26B, according to the configuration of the present modification example, since DC component is removed, saturation caused by DC drift can be prevented.

Next, the effects of the present modification example will be described. The present modification example is similar to the fourth embodiment in that the position of light is detected and the control is performed. Therefore, the effect of the fourth embodiment also applies to the present modification example.

As in the first modification example of the fourth embodiment, it is also possible to remove one side of the bridge circuit. The value of $v_2$ in the present modification example is a value obtained by passing the voltage vc through a predetermined filter, as represented by (Math. 15). Therefore, for example, it is sufficient to calculate the calculation when the controller 40 passes through the filter and output it as $v_2$. As described above, according to the present embodiment, it is possible to appropriately display an image in an imaging device having a function of displaying an image.

Fifth Embodiment

In the fourth embodiment, the piezoelectric element 1010 functioning as an actuator is divided into four partial regions, and a distortion detection signal is generated for each partial region. The present embodiment is an embodiment in which partial regions facing each other among four partial regions are set as one pair, and a distortion detection signal is generated for each pair. The configuration of the imaging device 5 in the present embodiment is common to the fourth embodiment in many parts, and a description thereof will be omitted. In the present embodiment, the internal configuration of the distortion detection unit and the internal configuration of the driving signal generation unit are new configurations. The distortion detection unit in the present embodiment is referred to as a distortion detection unit 36, and the driving signal generation unit in the present embodiment is referred to as a driving signal generation unit 26.

Figure 27:
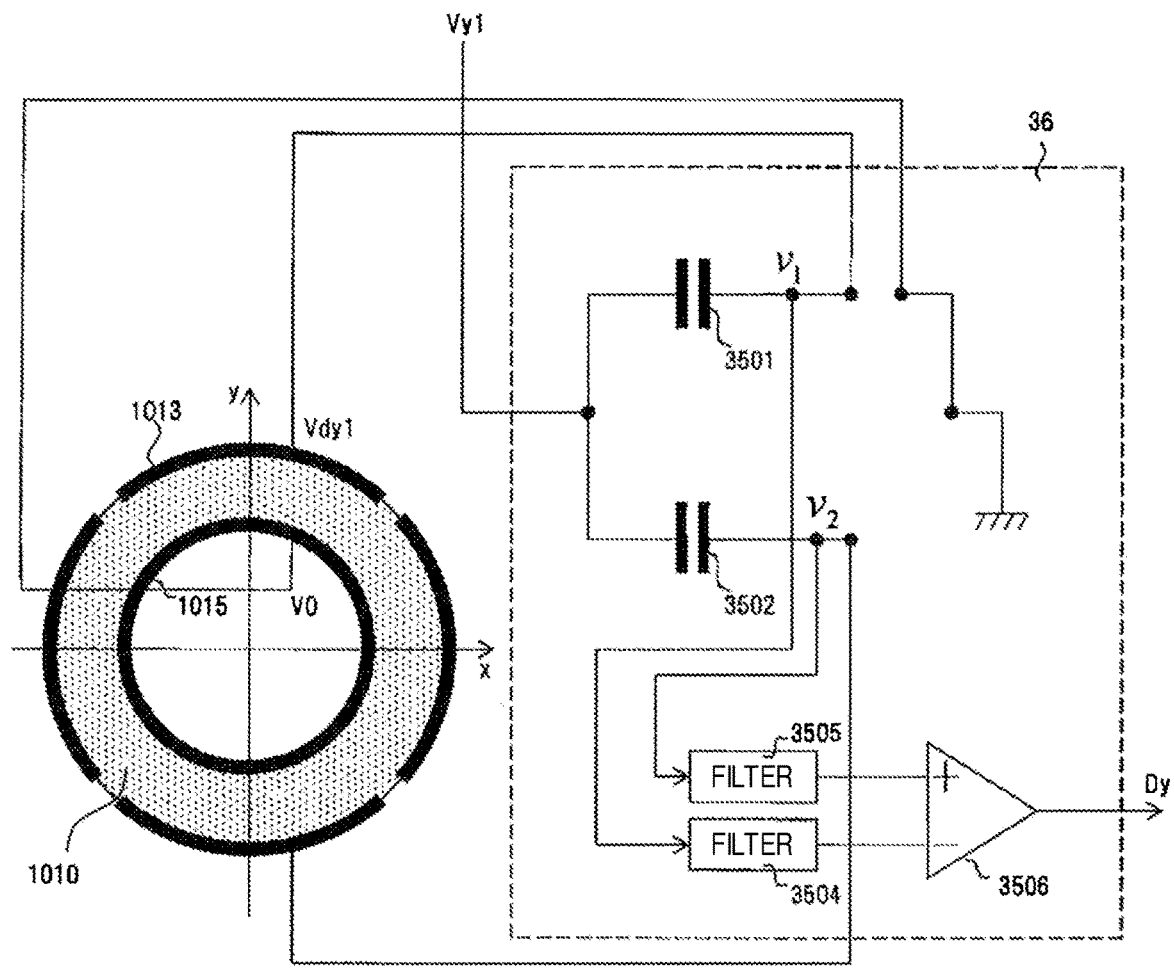
FIG. 27 is a diagram for describing a distortion detection unit 36 of the fifth embodiment and electrodes of a corresponding vibration unit 101.

The distortion detection unit 36 of the present embodiment and the electrodes of the corresponding vibration unit will be described with reference to FIG. 27. In FIG. 27, for the sake of explanation, a partial region interposed between an electrode 1013 and an electrode 1015 and a partial region interposed between an electrode 1014 and an electrode 1015 will be described by way of example. In the fourth embodiment, the same reference numerals are assigned to the elements common to those in FIG. 21 that corresponding to the fourth embodiment, and a description thereof will be omitted.

The distortion detection unit 36 includes a capacitor 3501, a capacitor 3502, a filter 3504, a filter 3505, and a difference circuit 3506. As illustrated in FIG. 27, a voltage Vy1 is applied to one end of the capacitor 3501. In addition, the other end of the capacitor 3501 is connected to the electrode 1013 of the outer periphery of the vibration unit 101. In addition, the electrode 1015 of the inner periphery of the vibration unit 101 is grounded. In this circuit, it can be seen that the piezoelectric element 1010 interposed between the electrode 1013 and the electrode 1015 is connected in series to the capacitor 3501. In addition, it can be seen that the voltage Vy1 is applied to the circuit in which the piezoelectric element 1010 interposed between the electrode 1013 and the electrode 1015 is connected in series to the capacitor 3501.

Similarly, the voltage Vy1 is applied to one end of the capacitor 3502. In addition, the other end of the capacitor 3502 is connected to the electrode 1014 of the outer periphery of the vibration unit 101. In addition, the electrode 1015 of the inner periphery of the vibration unit 101 is grounded. In this circuit, it can be seen that the piezoelectric element 1010 interposed between the electrode 1014 and the electrode 1015 is connected in series to the capacitor 3502. In addition, it can be seen that the voltage Vy1 is applied to the circuit in which the piezoelectric element 1010 interposed between the electrode 1014 and the electrode 1015 is connected in series to the capacitor 3502.

A voltage of an electric wire connecting the capacitor 3501 and the electrode 1013 is output as $v_1$, and a voltage of an electric wire connecting the capacitor 3501 and the electrode 1014 is output as $v_2$. Like in the fourth embodiment, the voltage $v_1$ and the voltage $v_2$ pass through the filter and then a difference is taken by the difference circuit 3506. In the present embodiment, the output signal of the difference circuit 3506 is output to the driving signal generation unit 26 as the distortion detection signal Dy.

The electrode 1013 and the electrode 1014, which are electrodes facing each other in the y-axis direction, have been described by way of example, but the same applies to the electrode 1011 and the electrode 1012, which are electrodes facing each other in the x-axis direction. That is, by configuring the same circuit with respect to the electrode 1011 and the electrode 1012, the distortion detection signal Dx is output in the same manner. The circuit configured with respect to the electrodes facing each other in the x-axis direction is not illustrated in FIG. 27.

Figure 28:
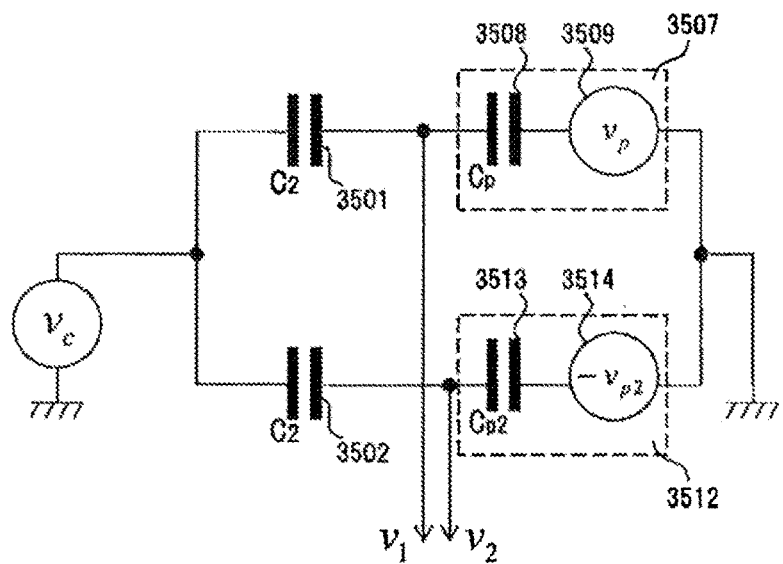
FIG. 28 is a diagram illustrating an equivalent circuit of the fifth embodiment.

An equivalent circuit of the electric circuit of the present embodiment is illustrated in FIG. 28. The same reference numerals are assigned to the elements common to those in FIG. 22 that is the equivalent circuit in the fourth embodiment, and a description thereof will be omitted. In the present embodiment, the partial region of the piezoelectric element 1010 is connected to two positions of the bridge circuit. The equivalent circuit 3507 is the same as described in the fourth embodiment, and is an equivalent circuit of the partial region of the piezoelectric element 1010 interposed between the electrode 1013 and the electrode 1015. In addition, the equivalent circuit 3512 is an equivalent circuit of the partial region of the piezoelectric element 1010 interposed between the electrode 1014 and the electrode 1015.

A equivalent capacitor 3513 is a capacitor having a capacitance $C_{p2}$ equivalent to the partial region of the piezoelectric element 1010 interposed between the electrode 1014 and the electrode 1015. In addition, a voltage source 3514 equivalently indicates a voltage generated by distortion of the partial region. Here, when the vibration unit 101 is distorted in a positive direction of y-axis, the voltage source 3509 outputs a positive voltage, and the voltage source 3514 outputs a negative voltage. This can be realized by performing polarization on four partial regions of the piezoelectric element 1010.

At this time, when an absolute value of the voltage source 3514 is $v_{p2}$, the value of the voltage source 3514 can be represented by $-v_{p2}$ as illustrated in FIG. 28. The voltages $v_1$ and $v_2$ in the present embodiment are calculated by the following equations.

[Math. 20]
$$v_1 = \frac{C_2}{C_p + C_2}(v_c - v_p) \quad \text{(Math. 20)}$$

[Math. 21]
$$v_2 = \frac{C_2}{C_{p2} + C_2}(v_c + v_{p2}) \quad \text{(Math. 21)}$$

Here, since two partial regions in the piezoelectric element 1010 are vertically symmetrical, the capacitance Cp is equal to the capacitance $C_{p2}$. Therefore, the sum of the value vp of the voltage source 3509 and the value $v_{p2}$ of the voltage source 3514 can be taken out by the following calculation.

[Math. 22]
$$v_s = v_2 - v_1 = \frac{C_2}{C_p + C_2}(v_{p2} + v_p) \quad \text{(Math. 22)}$$

Furthermore, when the piezoelectric element 1010 is distorted, it is reasonable to think that the upper surface of the electrode 1013 and the lower surface of the electrode 1014 are distorted in the same shape. Therefore, the distortion detection signal Dy output from the difference circuit 3506 of the present embodiment is a signal indicating distortion of the piezoelectric element 1010 in the y-axis direction.

Figure 29:
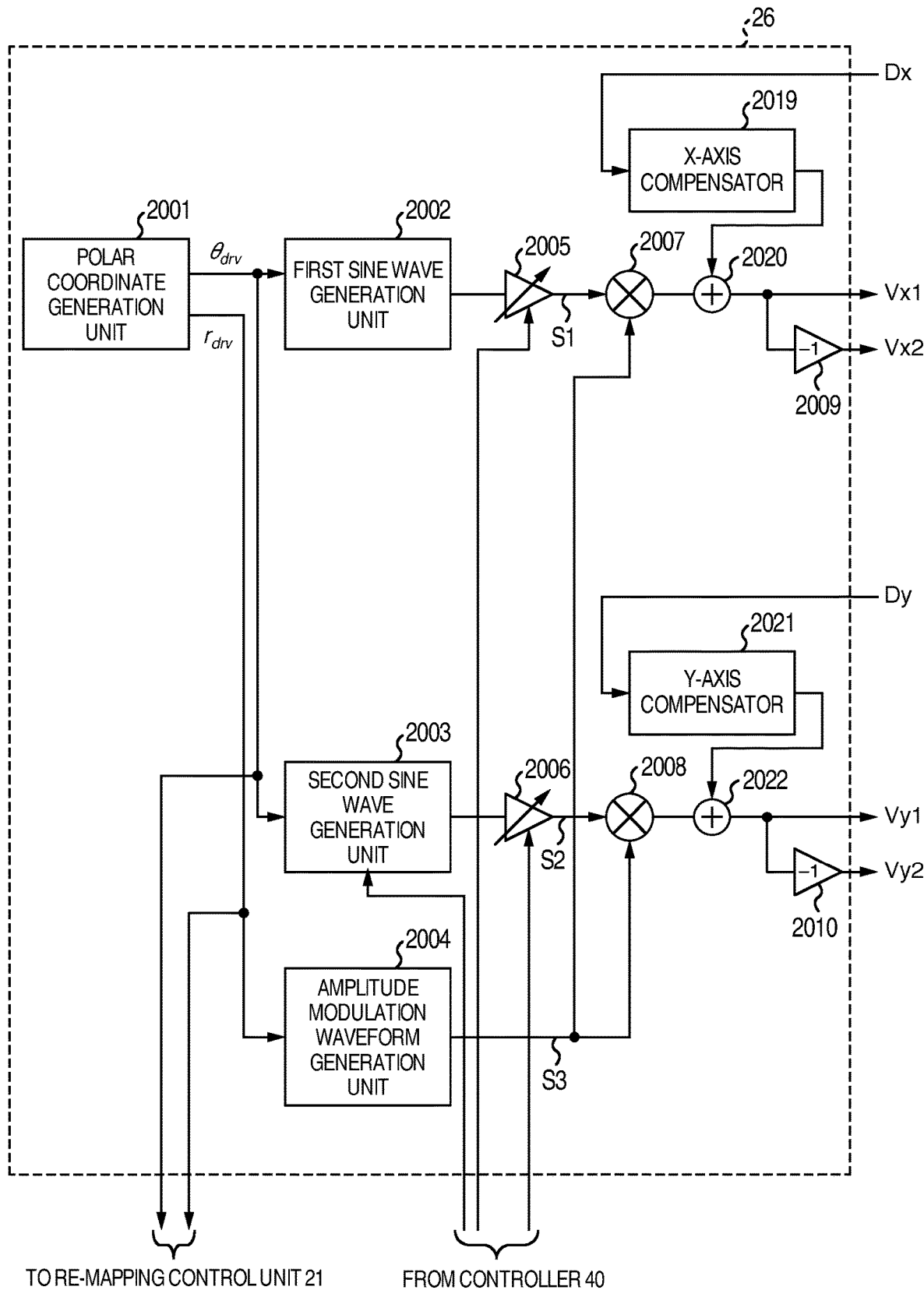
FIG. 29 is a block diagram illustrating a configuration of a driving signal generation unit 26 of the fifth embodiment.

The configuration of the driving signal generation unit 26 in the present embodiment will be described with reference to FIG. 29. FIG. 29 illustrates the configuration of the driving signal generation unit 26 in the present embodiment. The same reference numerals are assigned to the elements common to those in FIG. 6 that is the configuration diagram of the driving signal generation unit 20 in the first embodiment, and a description thereof will be omitted. The present embodiment differs from the configuration of FIG. 6, which is the configuration diagram of the driving signal generation unit 20 in the first embodiment, in terms of the circuit configuration subsequent to the first multiplier 2007, and the circuit configuration subsequent to the second multiplier 2008. The distortion detection signals Dx and Dy detected by the bridge circuit described above are input to the driving signal generation unit 26 of the present embodiment.

The X-axis compensator 2019 internally stores an ideal waveform of the distortion detection signal Dx. The X-axis compensator 2019 outputs, to the adder 2020, a signal obtained by compensating gain and phase with respect to a difference between the distortion detection signal Dx and the ideal waveform. The adder 2020 adds the output signal of the first multiplier 2007 and the output signal of the X-axis compensator 2019 and outputs the voltage Vx1. In addition, the amplitude of the voltage Vx1 is inverted by the first inverse gain 2009, and the inverted waveform becomes the voltage Vx2.

The Y-axis compensator 2021 internally stores an ideal waveform of the distortion detection signal Dy. The Y-axis compensator 2021 outputs, to the adder 2022, a signal obtained by compensating gain and phase with respect to a difference between the distortion detection signal Dy and the ideal waveform. The adder 2022 adds the output signal of the second multiplier 2008 and the output signal of the Y-axis compensator 2021 and outputs the voltage Vy1. In addition, the amplitude of the voltage Vy1 is inverted by the second inverse gain 2010, and the inverted waveform becomes the voltage Vy2.

Next, the effects of the present embodiment will be described. The present embodiment is common to the fourth embodiment in that the position of the light is detected and the control is performed. Therefore, the effects of the fourth embodiment also apply to the present modification example.

Furthermore, in the present embodiment, there are effects that are not provided by the fourth embodiment. This is a point that the present embodiment is configured to be able to prevent the bridge circuit from being unbalanced. As a result, it is possible to improve the light scanning accuracy over the configuration of the fourth embodiment. This effect will be described below.

In FIG. 22 that is the equivalent circuit of the fourth embodiment, the capacitance C1 of the capacitor 3503 is set to be equal to the capacitance $C_p$ of the partial region of the piezoelectric element 1010. However, electrical characteristics of the piezoelectric element 1010 or the capacitor 3503 are changed according to a characteristic change due to a temperature and a temporal change. Since the piezoelectric element 1010 and the capacitor 3503 have different characteristics, for example, if only the capacitance of the piezoelectric element 1010 changes due to a temperature, a distortion detection signal does not exhibit distortion, and thus control performance is deteriorated or feedback control becomes unstable. Furthermore, the piezoelectric element 1010 is not equivalent to a simple capacitor and an electrical loss exists. Due to this influence, a distortion detection signal does not exhibit distortion.

On the other hand, in FIG. 28 that is the equivalent circuit of the present embodiment, the capacitor corresponding to the capacitance $C_p$ of the equivalent capacitor 3508 is the capacitance $C_{p2}$ of the equivalent capacitor 3513. Both of them are a partial capacitance of the piezoelectric element 1010 and have the same dimension. Therefore, it is considered that the capacitance $C_{p1}$ and the capacitance $C_{p2}$ are the same, and the temperature characteristics or the temporal change are the same. In addition, the electrical loss is common to the equivalent capacitor 3508 and the equivalent capacitor 3513. Therefore, according to the configuration of the present embodiment, it is possible to prevent the loss of balance of the bridge circuit by disposing two partial regions of the piezoelectric element 1010 facing each other in the bridge circuit. As a result, the reliability of the distortion detection signal is improved with respect to temperature or temporal change. Deterioration of control performance or instability of the feedback control system can be avoided, thereby improving light scanning accuracy.

In the present embodiment, as in the configuration of the fourth embodiment, the case where the electric circuit component connected in series to the partial region of the piezoelectric element 1010 is the capacitor has been described. However, for example, the same applies to a case where the electric circuit component connected in series to the partial region of the piezoelectric element 1010 is a resistor as in the second modification example of the fourth embodiment. In this case, the same effects can also be obtained. As described above, according to the present embodiment, it is possible to appropriately display an image in the imaging device having the function of displaying an image.

In the second embodiment of the present specification, the function of capturing an image has been described, and in the third embodiment, the function of acquiring a distance image by TOF method has been described. As the expression encompassing the second embodiment and the third embodiment, it may be referred to as "capturing" function. That is, the term "capturing" in the present specification includes acquiring an image in visible light such as a general camera and acquiring a distance image by a TOF method. Alternatively, it may also be referred to as "imaging" function.

In addition, the value stored in the captured image storage memory 33 is a value obtained by integrating the intensity of the return light in the case of the second embodiment and is a value obtained by integrating the distance measured from the return light in the case of the third embodiment. The expression including the intensity of the return light in the case of the second embodiment and the measured distance in the case of the third embodiment may be referred to as "information relating to return light". For example, the imaging function described above is acquisition of an image in visible light and acquisition of a distance image obtained by TOF, but it is also possible to image by using other information relating to return light. As one example, it is also possible to measure the time until the intensity of the return light falls below a predetermined threshold value, store the time in the captured image storage memory 33, and performs imaging. This corresponds to, for example, a case where the object to be imaged is a phosphor and the sensitivity of the phosphor is measured. Alternatively, the time response of the return light may be accumulated for a predetermined period, and information (for example, the period during which the return light flickers) obtained from the accumulated information may be stored in the captured image storage memory 33 and imaged. In this manner, the value stored in the captured image storage memory 33 is not limited to the intensity of the return light and the measured distance.

In the second and third embodiments, the configuration that integrates the information relating to the return light and storing the integrated information in the captured image storage memory 33 has been described. However, it does not matter even if the integrating function is not provided. For example, taking the example 2 as an example, a configuration that does not integrate is possible by changing the configuration of the captured image generation unit 23. In that case, the output signal of the conversion circuit 2302 is connected to the din_a terminal of the captured image generation memory 33. Therefore, the addition in the adder 2303 is not performed and the input value Vi is stored in the captured image storage memory 33 as it is. In addition, the adder 2303, the addition pulse generation circuit 2304, the count-up circuit 2305, and the number-of-times-of-addition storage memory 34 become unnecessary and the circuit capacity can be reduced. Also in this case, since the operation of the re-mapping control unit 21 is the same as that of the second embodiment, the first effect of the second embodiment can be obtained. That is, the distortion of the captured image can be satisfactorily corrected.

Furthermore, the information relating to the return light may be processed by a method other than integration and may be stored in the captured image storage memory 33. For example, it may be configured so that a normal value/abnormal value is determined and an integrated value obtained by integrating only the normal value is stored. Alternatively, information relating to a plurality of return lights may be digitally processed to store a median value. Therefore, the value stored in the captured image storage memory 33 can be abstracted as "value relating to return light or information relating to return light subjected to predetermined processing".

Although it has been described that the PSD 60, the screen 61 and the camera 62 used for the distortion parameter adjustment described in the first embodiment are not included in the imaging device 1, they may be included in the imaging device 1. Therefore, even if there is an influence due to temporal change of the image distortion, it can be satisfactorily corrected.

In the fourth embodiment, the four distortion error signals are generated from the four partial regions, the compensators are provided for each of the four partial regions and are added to the four driving signals. However, as in the fifth embodiment, partial regions facing each other among the four partial regions may be set as one pair, and the distortion detection signals may be generated for each pair. In that case, for example, the average of the distortion detection signals Dy1 and Dy2 in the fourth embodiment may be used as the distortion detection signal with respect to the y axis.

In addition, the fourth embodiment and the fifth embodiment have been described taking an imaging device having a function of displaying an image as an example. However, it is similarly applicable to the imaging device having the function of imaging the image as in the second embodiment and the distance measurement device having the function of measuring the distance as in the third embodiment.

In the embodiment described above, the values of the first variable gain 2005 and the second variable gain 2006 are not varied depending on the time, but may be changed depending on the time. In this case, the operation is similar to that of the fourth embodiment. Unlike the fourth embodiment, the scanning accuracy of the laser spot can be improved by changing the values of the first variable gain 2005 and the second variable gain 2006 according to the time without using the distortion detection signal. Furthermore, the phase difference of the second sine wave generated by the second sine wave generation circuit 2003 may be changed according to the time in addition to the above. In addition, although the angle correction unit 2101 and the coordinate calculation unit 2102 have been described by dividing the blocks for explanation, they may be the same. This is apparent from the fact that it is also possible to perform the operation of summarizing (Math. 1) to (Math. 3) by one block.

The amplitude modulation waveform S3 of the above embodiment has a waveform which changes linearly with time, but is not limited thereto. The correction of brightness when not linear is determined based on (Math. 8). When the time derivative of the radius $r_{drv}$ and the radius $r_{drv}$ are defined as the emission frequency function, the laser lighting frequency may be changed in proportion to the emission frequency function.

Further, the amplitude modulation waveform S3 of the above embodiment has been described as the configuration in which the laser is turned on in a period in which the amplitude increases linearly from 0. This means that the laser is turned on during a period of drawing a spiral trajectory from the inner periphery to the outer periphery. However, the laser may be turned on during a period in which the amplitude decreases linearly and returns to 0, that is, a period in which a spiral trajectory is drawn from the outer periphery toward the inner periphery.

The detector inside the light receiving unit 12 in the second embodiment has been described as a current output type detector. However, the same configuration can also be applied to a current accumulation type detector such as CCD or CMOS. In the case of the current accumulation type detector, charges obtained by integrating a current is output, but this is correlated with the fact that the integration in the adder 2303 is performed by the detector. Therefore, when it is assumed that on/off of exposure is controlled in synchronization with switching of pixels and there are multiple trajectories in 1 pixel as illustrated in FIG. 17, it is possible to obtain the same effect as in the second embodiment by adding the exposure time for each trajectory. However, in the case of the current accumulation type detector, it is necessary to add the exposure time in a plurality of trajectories, and thus the circuit becomes complicated. Therefore, it is preferable to use the current output type detector in the configuration of the second embodiment.

Furthermore, in the above embodiment, the electrode 1015 on the inner periphery of the vibration unit 101 is grounded. However, the electrode 1015 can also be configured not to be installed on the ground. That is, the electrode 1015 may be floating, instead of being installed on the ground. As in the fourth embodiment or the fifth embodiment, even in the case of detecting distortion, it may be floating instead of being installed on the ground.

In the above embodiment, the trajectory of the light emitted from the light guide path 102 is expressed as a spiral trajectory. Ideally, the spiral will be nearly circular in both the outer periphery and the inner periphery. However, the ellipticity of the trajectory of the light emitted from the light guide path 102 is different between the inner periphery and the outer periphery as clarified in this specification. Therefore, at a certain radius, it may be a distorted ellipse instead of a circle. In addition, when the speed of modulating the amplitude is relatively fast with respect to the change of the ellipticity, there is a possibility that a trajectory of a certain circle and a trajectory of a next circle will intersect with each other. The spiral trajectory in this specification should be understood as an expression including such a case. Therefore, the spiral trajectory in the present specification refers to a trajectory which changes from the inner periphery to the outer periphery or from the outer periphery to the inner periphery when macroscopically grasped, and when microscopically grasped, it is not necessarily a general spiral.

In the second embodiment, the configuration of an imaging device that captures an image has been described as a configuration that stores the current output from the detector in the light receiving unit 12, that is, the light amount of the received light. In the third embodiment, the configuration of the distance measurement device has been described as a configuration in which the distance is measured from the output signal of the detector in the light receiving unit 12 and the measured distance value is stored. The present invention can be applied to both the imaging device and the distance measurement device, and can be abstracted as "storing the information relating to return light detected by the light receiving unit." In the above embodiment, since the imaging device of the above embodiment has the optical scanning unit 10, the imaging device may be read as an optical scanning device.

It should be noted that the present invention is not limited to the above-described embodiments, and includes various modifications besides the above-described modifications. For example, the above-described embodiments have been described in detail in order to explain the present invention in an easy-to-understand manner, and are not necessarily limited to those having all the configurations described above. In addition, it is possible to replace part of the configuration of one embodiment with the configuration of another embodiment, and the configuration of another embodiment can be added to the configuration of one embodiment. Further, it is possible to add, delete, or replace other configurations with respect to part of the configuration of each embodiment.

Further, each of the above-described configurations, functions, processing units, processing means, and the like may be realized by hardware, for example, by designing some or all of them with an integrated circuit or the like. In addition, each of the above-described configurations, functions, and the like may be realized by software by interpreting and executing a program that the processor realizes each function. Information such as programs, tables, files, and the like that realize each function can be stored in a memory device, a recording device such as a hard disk, an slid state drive (SSD), or a recording medium such as an IC card, an SD card, a DVD. In addition, control lines and information lines indicate what is considered to be necessary for explanation, and all control lines and information lines are not necessarily shown for products. In practice, it can be considered that almost all the structures are mutually connected.

It should be further understood by those skilled in the art that although the foregoing description had been made on embodiments of the invention, the invention is not limited thereto and various changes and modifications may be made without departing from the spirit of the invention and the scope of the appended claims.

The invention claimed is:

1. An optical scanning device for displaying or capturing an image, the optical scanning device comprising:
    an optical scanning unit configured to scan emitted light while drawing a spiral trajectory, the optical scanning unit including:
        a light guide path configured to guide incident light to output the emitted light from an emission end; and
        a vibration unit configured to vibrate the emission end;
    a light emission control unit configured to control light emission of the emitted light;
    a polar coordinate generation unit configured to generate a radius $r_{drv}$ and a deflection angle relating to the spiral trajectory;
    a driving signal generation unit configured to generate a driving signal for driving the vibration unit by using the radius $r_{drv}$ and the deflection angle;
    an angle correction unit configured to perform calculation for correcting an angle based on information from the driving signal generation unit and output a corrected angle $\theta_{calc}$; and
    a coordinate calculation unit configured to calculate coordinates of an image by using the radius $r_{drv}$ and the corrected angle and output image coordinates; and
    when a(r) and b(r) are functions having raw as an argument, the coordinate calculation unit outputs a result calculated by using $a(r) \cdot r_{drv} \cdot \cos(\theta_{calc})$ as an x-coordinate of the image coordinates and outputs a result calculated by using $b(r) \cdot r_{drv} \cdot \sin(\theta_{calc})$ as a y-coordinate of the image coordinates.

2. The optical scanning device according to claim 1, wherein, when the deflection angle is $\theta_{drv}$ and f(r) is a function having the radius raw as an argument, the angle correction unit outputs the corrected angle $\theta_{calc}$ so as to satisfy formula (1):

$$\theta_{calc} = \theta^{drv} + f(r_{drv}) \qquad \text{formula (1)}.$$

3. The optical scanning device according to claim 1, wherein the optical scanning device comprises a display image storage unit configured to store a display image, and
    the light emission control unit control the light emission of the emitted light based on the image coordinates output by the coordinate calculation unit and information read from the display image storage unit.

4. The optical scanning device according to claim 1, wherein the optical scanning device comprises:
    a light receiving unit configured to detect return light of the emitted light emitted from the emission end of the light guide path; and
    a captured image storage unit configured to store a captured image,
    wherein the captured image storage unit stores information on the return light detected by the light receiving unit, based on the image coordinates output by the coordinate calculation unit.

5. The optical scanning device according to claim 1, wherein the optical scanning device comprises:
    a light receiving unit configured to detect return light of the emitted light emitted from the emission end of the light guide path; and
    a captured image storage unit configured to store a captured image,
    wherein information stored in the captured image storage unit is a value obtained by performing predetermined processing on information on the return light detected by the light receiving unit.

6. The optical scanning device according to claim 1, wherein the optical scanning device comprises:
    a light receiving unit configured to detect return light of the emitted light emitted from the emission end of the light guide path; and
    a captured image storage unit configured to store a captured image,
    wherein information stored in the captured image storage unit is a value obtained by performing predetermined processing on information on the return light detected by the light receiving unit over a period in which the spiral trajectory is drawn a predetermined number of times.

7. The optical scanning device according to claim 4, wherein the information on the return light is a light amount of the return light detected by the light receiving unit.

8. The optical scanning device according to claim 4, wherein the light receiving unit outputs a current in proportion to a light amount of the return light, and
    information on the return light is a current value of the current outputted by the light receiving unit.

9. The optical scanning device according to claim 4, wherein the optical scanning device comprises a distance measurement unit configured to measure a distance by using an output signal of the light emission control unit and an output signal of the light receiving unit, and
    information on the return light is distance information measured by the distance measurement unit.

* * * * *